US005629784A

United States Patent [19]
Abileah et al.

[11] Patent Number: 5,629,784
[45] Date of Patent: May 13, 1997

[54] LIQUID CRYSTAL DISPLAY WITH HOLOGRAPHIC DIFFUSER AND PRISM SHEET ON VIEWER SIDE

[75] Inventors: Adiel Abileah, Farmington Hills; Nicholas D. Vergith, Holly, both of Mich.

[73] Assignee: OIS Optical Imaging Systems, Inc., Troy, Mich.

[21] Appl. No.: 229,337

[22] Filed: Apr. 12, 1994

[51] Int. Cl.$^6$ .................... G02F 1/1335; G02B 5/02
[52] U.S. Cl. .................... 349/112; 359/599; 359/609; 349/65
[58] Field of Search ................ 359/40, 41, 42, 359/69, 609, 599; 385/901

[56] References Cited

U.S. PATENT DOCUMENTS

| | | | |
|---|---|---|---|
| 3,671,101 | 6/1972 | Finch | 359/599 |
| 4,088,400 | 5/1978 | Assouline et al. | |
| 4,139,261 | 2/1979 | Hilsum | |
| 4,171,874 | 10/1979 | Bigelow et al. | |
| 4,183,630 | 1/1980 | Funada et al. | |
| 4,264,147 | 4/1981 | Baur et al. | |
| 4,660,936 | 4/1987 | Nosker | |
| 4,704,004 | 11/1987 | Nosker | |
| 4,729,641 | 3/1988 | Matsuoka et al. | |
| 4,753,516 | 6/1988 | Doi et al. | 359/609 |
| 4,798,448 | 1/1989 | van Raalte | |
| 4,802,737 | 2/1989 | Denton | 359/609 |
| 4,874,228 | 10/1989 | Alto et al. | |
| 4,883,343 | 11/1989 | Teshirogi | |
| 4,904,049 | 2/1990 | Hegg | |
| 4,915,479 | 4/1990 | Clarke | |

(List continued on next page.)

FOREIGN PATENT DOCUMENTS

| | | |
|---|---|---|
| 0179913 | 7/1986 | European Pat. Off. |
| 0377309 | 11/1990 | European Pat. Off. |
| 0491662 | 6/1992 | European Pat. Off. |
| 0479490 | 8/1992 | European Pat. Off. |
| 53-42054 | 4/1978 | Japan |
| 169131 | 10/1983 | Japan |
| 60-202425 | 10/1985 | Japan ............ 359/69 |
| 239710 | 11/1985 | Japan |
| 241024 | 11/1985 | Japan |
| 233623 | 11/1985 | Japan |
| 61-148430 | 7/1986 | Japan |
| 148430 | 7/1986 | Japan |
| 61-232421 | 10/1986 | Japan ............ 359/40 |
| 62-55624 | 3/1987 | Japan |
| 63-159824 | 7/1988 | Japan |
| 2118518 | 5/1990 | Japan |
| 3171117 | 7/1991 | Japan ............ 359/69 |
| 32888 | 2/1992 | Japan |
| 67178 | 3/1994 | Japan |
| 695099 | 4/1994 | Japan |

OTHER PUBLICATIONS

"3M Scotch™ Optical Lighting Film Application Bulletin Thin Light Box" By Chuck Sherman Nov. 1988.
"3M Scotch™ Optical Lighting Film General Theory" By Chuck Sherman Nov. 1988.

*Primary Examiner*—William L. Sikes
*Assistant Examiner*—Kenneth Parker
*Attorney, Agent, or Firm*—Myers Liniak & Berenato

[57] ABSTRACT

A backlight liquid crystal display including a collimated backlight for illuminating a display panel having a liquid crystal layer sandwiched between rear and front polarizers, the panel including an optical refracting film and a diffuser laminated adjacent the front surface of the panel. The refracting film and light scattering diffuser may be either exterior or interior the front polarizer, but on the viewer side of the liquid crystal layer. The optical system of the refracting faceted film along with the diffuser maintains the resolution of the display, improves the contrast ratio over a wide range of viewing angles, reduces its ambient light reflectively, reduces color shifting, substantially eliminates inversion, and enlarges the effective viewing zone of the display.

12 Claims, 30 Drawing Sheets

U.S. PATENT DOCUMENTS

| | | |
|---|---|---|
| 4,936,659 | 6/1990 | Anderson et al. . |
| 5,035,490 | 7/1991 | Hubby, Jr. . |
| 5,046,827 | 9/1991 | Frost et al. . |
| 5,066,108 | 11/1991 | McDonald . |
| 5,128,783 | 7/1992 | Abileah et al. . |
| 5,132,830 | 7/1992 | Fukutani et al. . |
| 5,159,478 | 10/1992 | Akiyama et al. . |
| 5,161,041 | 11/1992 | Abileah et al. . |
| 5,184,236 | 2/1993 | Miyashita et al. . |
| 5,198,922 | 3/1993 | Chahroudi ................... 359/609 |
| 5,225,920 | 7/1993 | Kasazumi et al. . |
| 5,262,880 | 11/1993 | Abileah . |
| 5,280,371 | 1/1994 | McCartney, Jr. et al. . |
| 5,292,625 | 3/1994 | McFadden et al. . |
| 5,442,467 | 8/1995 | Silverstein et al. ................. 359/42 |

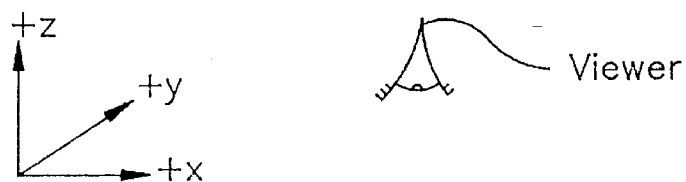
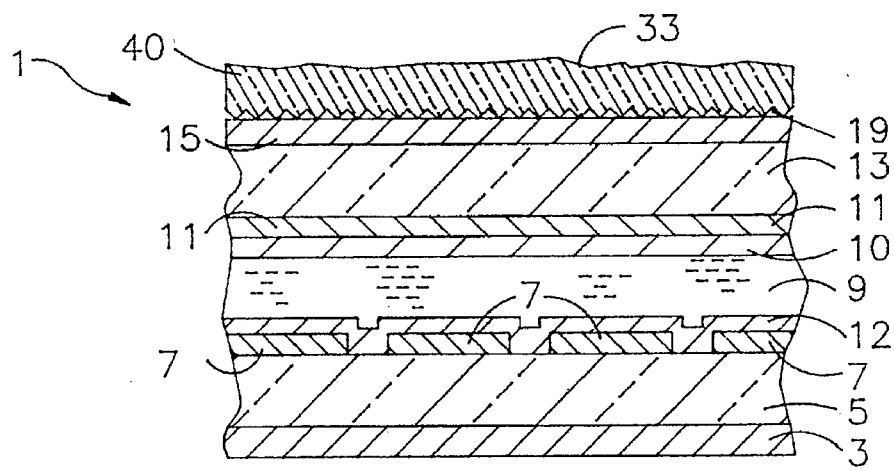
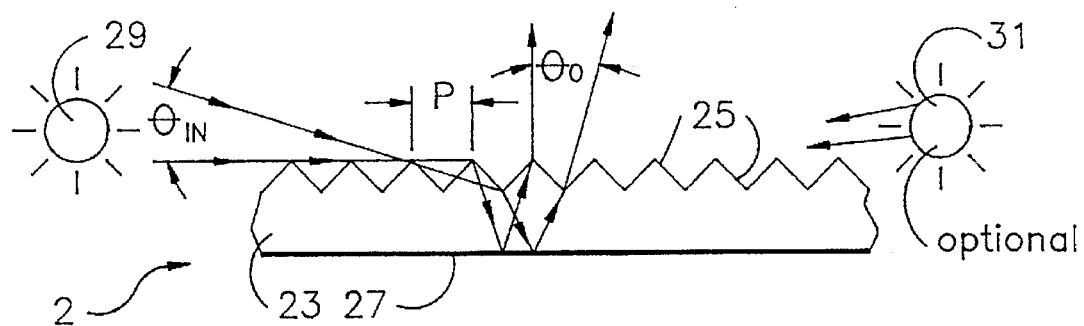
Fig. 1(b)

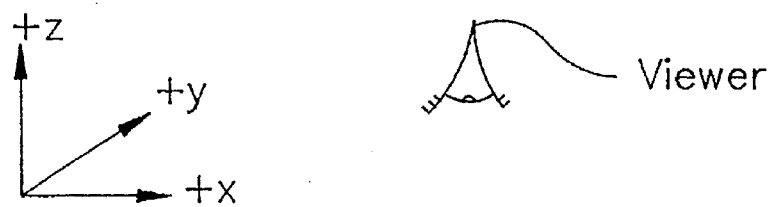
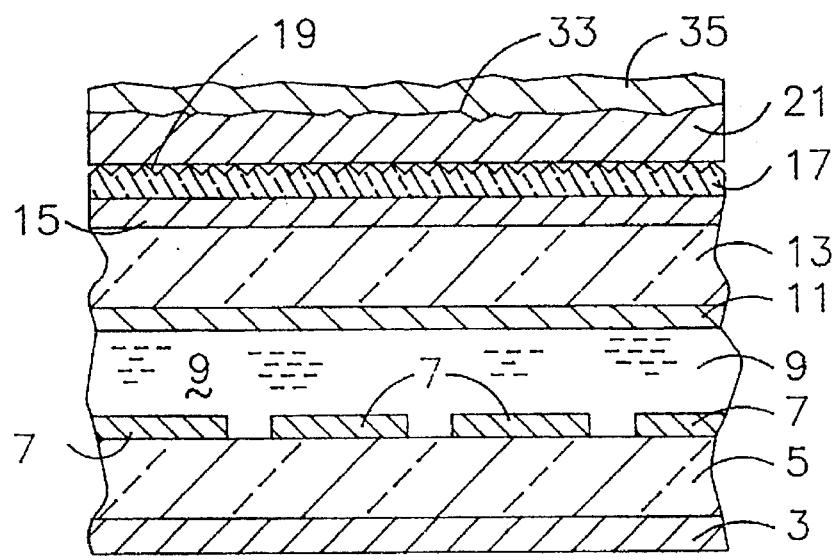
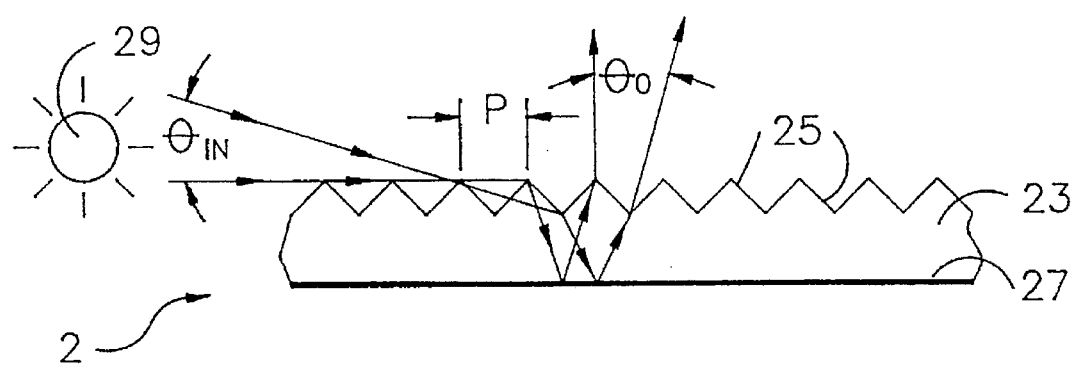
Fig. 2

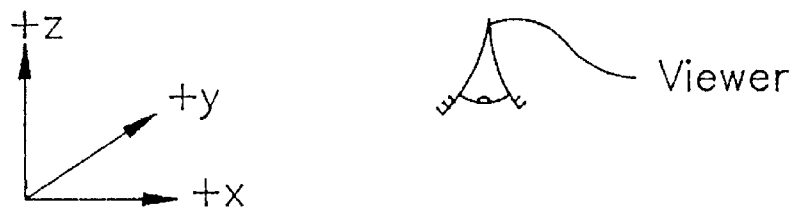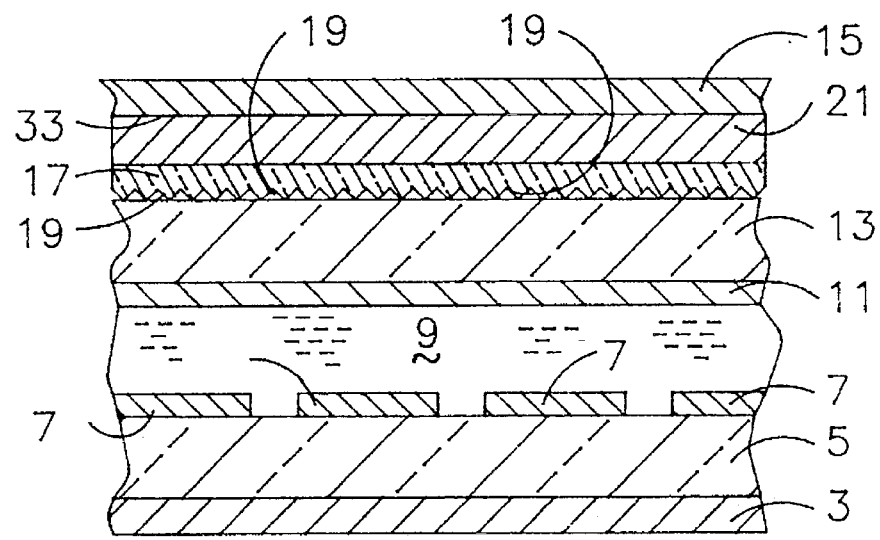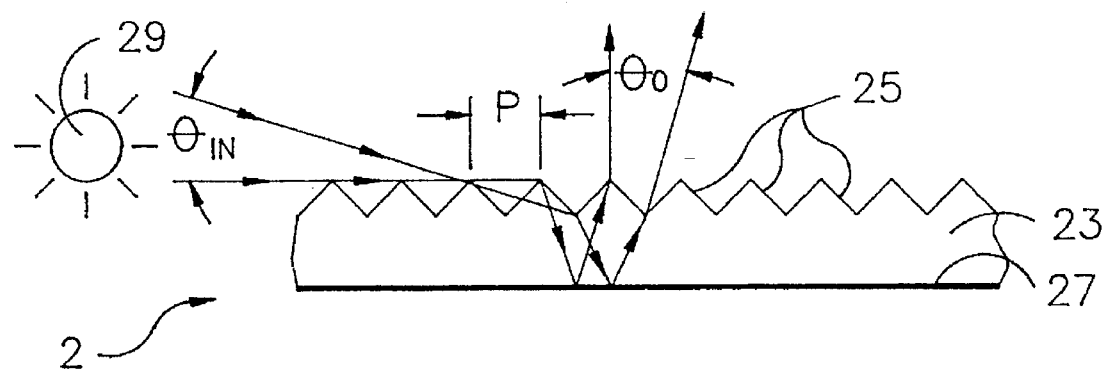
Fig. 3

EXAMPLE 1

"a" = 4"
"b" = 9"

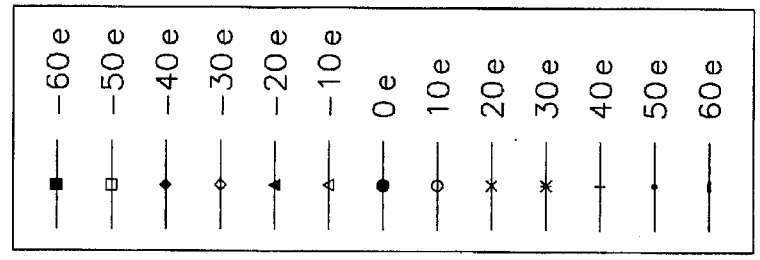
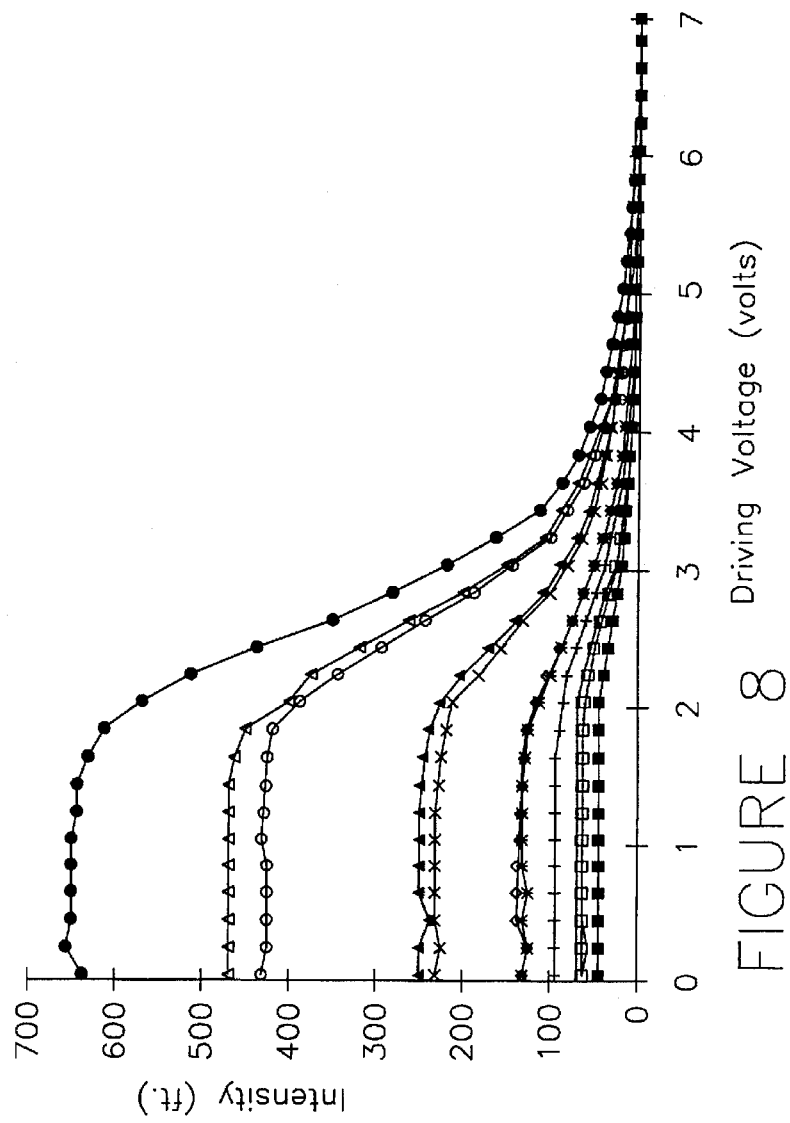
FIGURE 8

EXAMPLE 2
"a" = 4"
"b" = 9"

EXAMPLE 3

EXAMPLE 4
"a" = 4"
"b" = 9"

EXAMPLE 5
"a" = 4"
"b" = 9"

EXAMPLE 6

SPECULAR
REFLECTION

DIFFUSED
REFLECTION

LIQUID CRYSTAL DISPLAY WITH HOLOGRAPHIC DIFFUSER AND PRISM SHEET ON VIEWER SIDE

This invention relates to a liquid crystal display having an enlarged viewing zone. More particularly, this invention relates to a liquid crystal display which provides a substantially large and uniform viewing envelope with respect to contrast, ambient reflection, inversion (i.e. lack of), resolution, and color uniformity.

BACKGROUND OF THE INVENTION

Liquid crystal displays (LCDs) have been commercially available for years, but until recently were generally restricted to relatively small sizes. Such displays were widely used originally in, for example, watches, calculators, radios, and other products requiring character and/or image indicators in relatively small display areas. Attempts to employ larger area LCDs initially provided such unacceptable levels of contrast, cost, and other characteristics as to render them commercially infeasible.

Recently, improvements in liquid crystal display technology have allowed larger active (AMLCD) and passive (PMLCD) matrix type displays to be commercially manufactured. AMLCDs, for example, have achieved widespread acceptance in portable computers, laptop computers, word processors, and avionic cockpit applications. Other products in which such displays are useful include flat screen and projection television systems. In each of the above LCD applications, it is desirable to have: high contrast ratios over a large viewing zone or envelope; little or no inversion; low amounts of ambient light reflectance; high resolution; and little or no color shifting over a wide range of viewing angles. However, when going to these larger displays where these characteristics are most needed, they have not always been capable of optimization. Indeed, one characteristic heretofore may have had to have been traded off against another in order to achieve commercial acceptability.

Liquid crystal materials are useful for such displays because light traveling therethrough is affected by the anisotropic or birefringent value ($\Delta n$) of the LC material, which in turn can be controlled by the application of a variable voltage across the LC. Backlit liquid crystal displays are desirable because the transmission of light emanating from the backlight assembly can be controlled with a substantially low amount of power, i.e. less than that typically required to illuminate other types of prior art displays such as CRTs. Furthermore, the thin profile of such LCDs gives them an added advantage over conventional CRTs.

The information displayed by, for example, AMLCDs is presented in the form of a matrix array of rows and columns of numerals or characters, which are generated by a number of segmented electrodes arranged in a matrix pattern. The segments are connected by individual leads to driving electronics, which act to apply a variable and controllable voltage to the appropriate combination of segments to thereby display the desired data and information by controlling the light transmitted through the LC material. Graphic information in, for example, avionic cockpit applications or television displays may be achieved by an active matrix of pixels which are connected by an X-Y sequential addressing scheme between two sets of perpendicular conductive lines (i.e. row and column address lines). Current advanced addressing schemes use conventional arrays of, for example, amorphous silicon (a-Si) TFTs, amorphous silicon thin film diodes, MIMs, etc., which act as switching elements to control the variable driving voltages at individual pixels (or colored subpixels). These schemes are applied to both twisted nematic (TN) and ECB (electrically controlled birefringence) liquid crystal displays as well as other conventional types. In a similar manner, STNs are generally multiplexed in order to selectively address each pixel.

Contrast ratio, ambient light reflection, gray level behavior, resolution, color shifting, and inversion, all of which have conventional definitions well-known in the art, are important attributes determining the quality of liquid crystal displays of all types.

The contrast ratio (i.e. contrast—1) in a NW display, for example, is the difference between "off state" transmission versus "on state" transmission in low ambient conditions, and is determined by dividing the "off state" light transmission (high intensity white light) by the "on state" or darkened intensity. For example, if an "off state" (i.e. below the threshold driving voltage) NW display exhibits an intensity of 200 fL and the same display in its fully driven "on state" emits 5 fL at the same viewing angle that the aforesaid 200 fL measurement was taken, both in low ambient conditions, then the display's contrast ratio at that particular viewing angle is 40 or 40:1. Accordingly, in normally white LCDs, the primary factor limiting the contrast ratio is the amount of light which leaks through the display in the darkened or "on state". In normally black LCDs, the primary factor limiting the contrast ratio achievable is the amount of light which leaks through the display in the darkened or "off state". The higher and more uniform the contrast ratio of a display over a large range of viewing angles, the better the LCD. Contrast ratio problems are compounded in bright environments, such as sunlight and other high intensity ambient conditions, where there is a considerable amount of reflected and scattered ambient light adjacent the display.

The lesser the amount of ambient light reflected from the display panel, the better the viewing characteristics of the display. Therefore, it is desirable to have an LCD reflect as little ambient light as possible. The amount of ambient light reflected by a display panel is typically measured via conventional specular and diffused reflection tests discussed later herein and illustrated by FIGS. 23 and 24.

In color LCDs, the aforesaid light leakage often causes severe color shifts for both saturated and gray scale colors. The shifting of such colors and/or images is particularly harmful when the display is to be viewed at increased or large viewing angles, such as in an avionic cockpit where the copilot's view of the pilot's displays is important. An example of color shifting is when a display pixel outputting the color navy blue at normal (0° vertical, 0° horizontal) clearly appears navy blue to the viewer at normal but appears either sky blue or purple when viewed at increased viewing angles (e.g. 0° vertical, 45° horizontal), these viewing angles being defined herein with reference to FIG. 22 and its corresponding description. It is highly desirable that an LCD substantially maintain color uniformity over a wide range of viewing angles so that one or more viewers see the same image no matter what viewing angle they are positioned at. Accordingly, the less color shifting in a display, the better its viewing characteristics.

Gray level performance of liquid crystal displays and the corresponding amount of inversion is also very important in determining the quality of an LCD. Conventional AMLCDs, for example, utilize anywhere from about 8 to 64 different driving voltages. These different driving voltages are typically referred to as gray level voltages. The intensity of light transmitted through the colored subpixel, pixel, or display depends upon its driving voltage. Accordingly, gray level voltages are used to generate different shades of different colors so as to create different colors when, for example, these shades are mixed with one another.

Preferably, the higher the driving voltage in, for example, a normally white twisted nematic display, the lower the intensity (fL) of light transmitted therethrough. Likewise then, the lower the driving voltage in such a normally white display, the higher the intensity of light emitted therefrom. The opposite is true in normally black twisted nematic displays.

Thus, by utilizing multiple gray level driving voltages, one can manipulate, for example, either a normally white (NW) or normally (NB) black display pixel (or colored subpixel) to emit a desired intensity of light. A gray level $V_{on}$ is any voltage greater than $V_{th}$ (threshold voltage) up to about 5.0 to 6.5 volts.

In conventional LCDs, inversion often adversely affects the aforesaid described gray level performance of the display, inversion being discussed and defined later herein. It is desirable in gray level performance of, for example, NW displays to have an intensity versus driving voltage curve wherein the intensity (i.e. fL) of light emitted from the pixel or subpixel continually and monotonically decreases as the driving voltage increases. In other words, it is desirable to have gray level performance in a NW pixel such that at all viewing angles the intensity of light emitted at 6.0 volts is less than that at 5.0 volts, which is in turn less than that at 4.0 volts, which is less than that at 3.0 volts, which is in turn less than that at 2.0 volts, etc. The opposite is true with respect to NB displays.

Inversion occurs in a NW display when the intensity (fL) at certain viewing angles at e.g. 3.0 volts is greater than that at 2.0 volts. This leads to different intensities and/or colors of light being viewed at various viewing angles of the display even when the same voltage is being applied. Accordingly, the elimination of inversion in LCDs is an always desired result. The problems of inversion are more thoroughly discussed in co-pending commonly owned Ser. No. 08/167,652, filed Dec. 15, 1993, the disclosure of which is incorporated herein by reference.

Normally black twisted nematic displays typically have better contrast ratio contour curves or characteristics than do their counterpart normally white displays. However, normally black (NB) displays are much harder to manufacture than NW displays due to their high dependence on the cell gap or thickness "d" of the liquid crystal material. Accordingly, a long felt need in the art, particularly in the art of manufacturing larger LCDs, has been the ability to construct a normally white display with high contrast ratios over a large range of both vertical and horizontal viewing angles, rather than having to resort to the more difficult to manufacture NB display to achieve these characteristics. While the subject invention is equally applicable to both NW and NB displays, one of its unique features is that it so successfully solves this long felt need by achieving at least those characteristics of NB displays in the simpler to construct NW displays provided according to this invention.

Heretofore, retardation films have been used in normally white displays in an attempt to enlarge their relatively small effective viewing areas and to reduce inversion. See, for example, U.S. Pat. No. 5,184,236 and aforesaid Ser. No. 08/167,652. These normally white TN displays with dual retardation films achieve fairly high contrast ratios over a relatively large range of viewing angles compared to other NW displays. Additionally, the reflectance of ambient light (e.g. sunlight) in both these displays is kept to a minimum by disposing the retardation films and LC material within opposing linear polarizers. Typically, an AR coating is provided exterior the front polarizer. Thus, both these displays achieve acceptable results with respect to both the size of their viewing zones and the amount of ambient light reflectance seen by the viewer. In the latter instance, improvements over the former with respect to the displays viewing characteristics are self-evident. While the solution of retardation films has proven efficacious, it would be desirable to eliminate the use of such films as well as to improve if possible upon the characteristics of the effective viewing zones, color shifting, contrast ratios, resolution, and inversion affecting gray scale levels over a wide range of viewing angles, particularly in the larger LCD sizes.

Prior to the subject invention, other attempts have been made to improve the viewing characteristics of liquid crystal displays by way of providing diffusers exterior the display's front polarizer. See, for example, U.S. Pat. Nos. 4,171,874; 4,704,004; and 5,046,827. The displays of these patents include light diffusers positioned in the view path of the display exterior the display's front polarizer. The sought after result is apparently an enlarged viewing zone. However, these displays including diffusers disposed exterior the front polarizer, or between the viewer and the front polarizer, typically experience a problem with respect to ambient light reflection. At times and in addition, color shifting, resolution, and inversion are less than optimal.

It is apparent from the above that there exists a long felt need in the art for a liquid crystal display (normally white, normally black, active, passive, TN, STN, etc.) for outputting high contrast ratio images over an increased range of viewing angles to a remotely positioned viewer, the display maintaining color uniformity over a wide range of viewing angles and having high resolution, relatively low ambient light reflectance, and little or no inversion.

SUMMARY OF THE INVENTION

Generally speaking, this invention fulfills the above-described needs in the art by providing in a backlit liquid crystal display which includes a backlight assembly for directing light toward a display panel, the display panel including a liquid crystal layer and being capable of providing an image to a remotely positioned viewer, the improvement comprising:

an optical system disposed on the viewer side of the liquid crystal layer, the optical system including a film means for substantially enlarging the effective viewing zone of the liquid crystal display and for providing substantial uniformity of illumination thereto with respect to contrast ratio and color uniformity, and wherein said film means has a plurality of optical facets therein.

This invention further fulfills the above-described needs in the art by providing a method of providing an image to a viewer from a liquid crystal display device, the method comprising the steps of:

a) directing light toward a display panel via a backlight;
b) applying a voltage across a liquid crystal layer in the display panel by way of a pair of electrodes sandwiching the liquid crystal layer; and
c) optically refracting the light after it exits the liquid crystal layer by use of a film means having a plurality of optical facets so as to maintain the resolution of the image displayed to the viewer, and whereby the film means limits the amount of panel ambient reflection.

In certain preferred embodiments of this invention, the optical system provided in the display has a contrast ratio of at least about 70:1 along the 0° vertical viewing axis at horizontal viewing angles up to about ±60°.

In certain further preferred embodiments of this invention, the optical system further includes a holographic diffuser affixed to the display panel on the viewer side of the liquid crystal layer, wherein the display panel, when white substantially collimated light is directed toward the panel from the backlight, has at least the following viewing characteristics:

a) a specular reflectance at about 30° horizontal of less than about 0.5%;

b) a diffused reflectance at about 30° horizontal of less than about 4%; and c) a contrast ratio of at least about 60:1 at viewing angles of one of:
      i) about 0° vertical, ±60° horizontal; and
      ii) about 0° horizontal, ±40° vertical; the viewing angles being defined herein.

This invention further fulfills the above described needs in the art by providing a backlit LCD comprising:

a backlight for directing light toward a display panel having a liquid crystal layer;

electrode means for applying a voltage across the liquid crystal layer; and integral reverse-collimating and refracting means for substantially collimating ambient light directed toward the liquid crystal layer thereby reducing the amount of ambient light reflection off of the display panel, and for refracting light from the backlight after it exits the liquid crystal layer so as to maintain the resolution of the image displayed to the viewer over a wide range of viewing angles.

This invention further fulfills the above described needs in the art by providing in a backlit LCD including a backlight for directing light toward a display panel, the display panel including a liquid crystal layer and means for applying a voltage across the liquid crystal layer, the display being capable of providing an image to a remotely positioned viewer, the improvement comprising:

reverse-collimating means for substantially collimating ambient light directed toward the display panel so as to reduce ambient light reflection off of the display panel, the reverse-collimating means disposed on the viewer side of the liquid crystal layer.

This invention will now be described with respect to certain embodiments thereof, accompanied by certain illustrations, wherein:

IN THE DRAWINGS

FIG. 1(b) is a side elevational cross-sectional view of a backlit LCD assembly according to a second embodiment of this invention.

FIG. 2 is a side elevational cross sectional view of a backlit liquid crystal display assembly according to a third embodiment of this invention.

FIG. 3 is a side elevational cross sectional view of a backlit liquid crystal display assembly according to a fourth embodiment of this invention.

FIGS. 5(b)–5(g) are color coordinate and light spectrum graphs of the Example 1 AMLCD including both the diffuser and optical film exterior the front polarizer.

Figure 6:
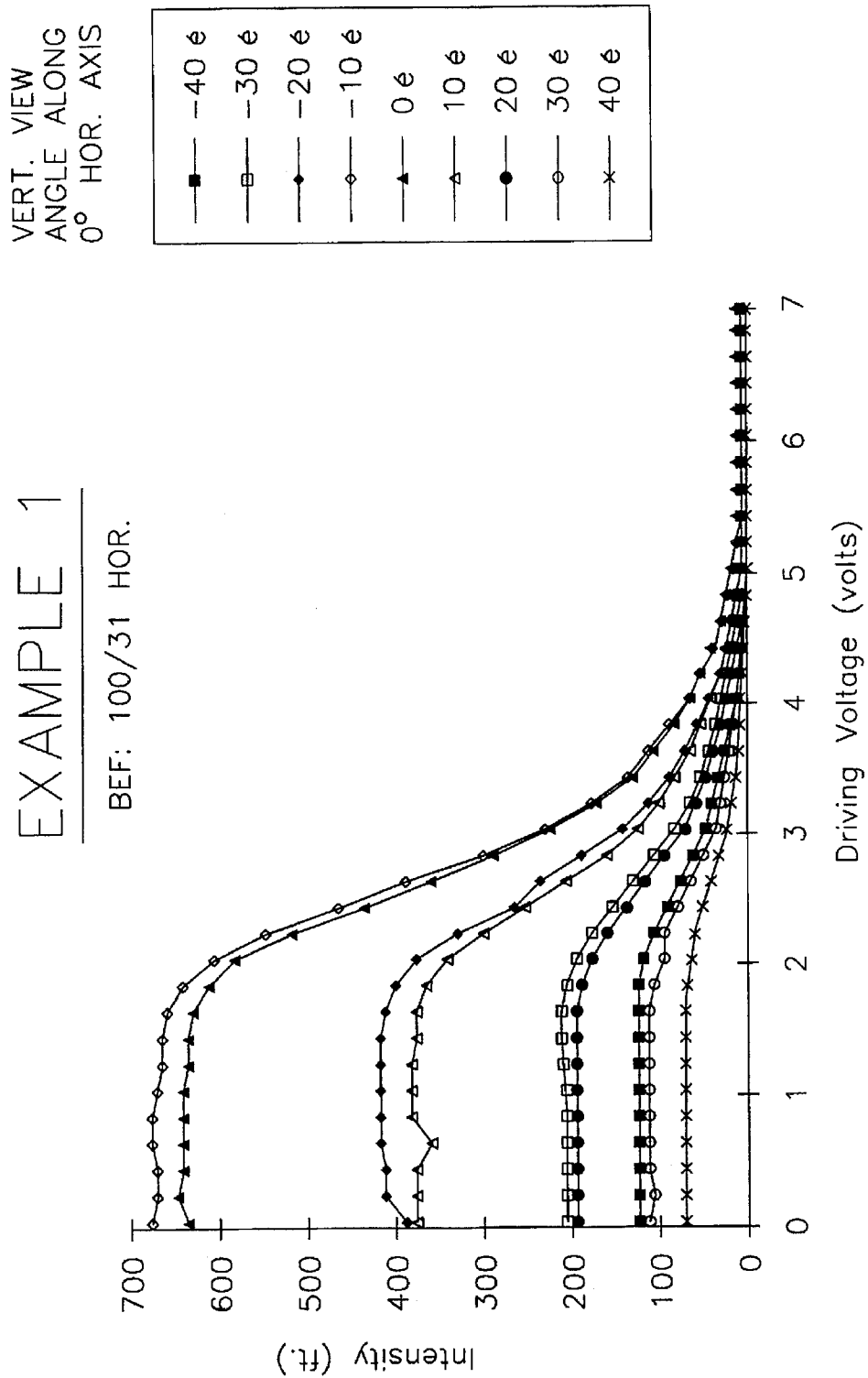

FIG. 6 is the intensity versus driving voltage plot or graph illustrating the intensity at various vertical viewing angles along the 0° horizontal axis of the Example 1 AMLCD having a diffuser and corresponding optical film.

Figure 7:
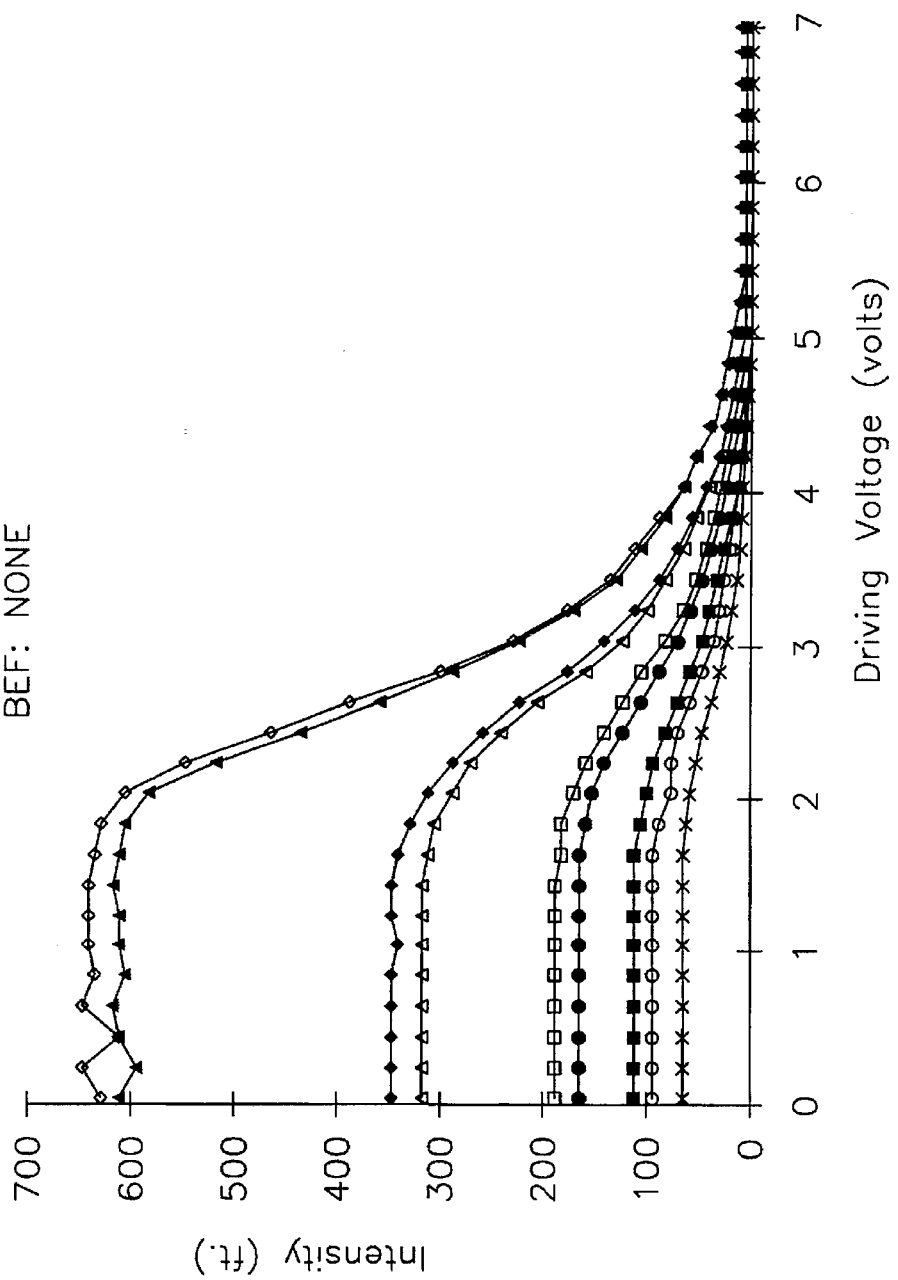

FIG. 7 is the intensity versus driving voltage plot illustrating the intensity at a variety of vertical viewing angles along the 0° horizontal axis of the second Example 1 AMLCD, this AMLCD utilizing only a diffuser, and no optical faceted film adjacent thereto.

Figure 5A:
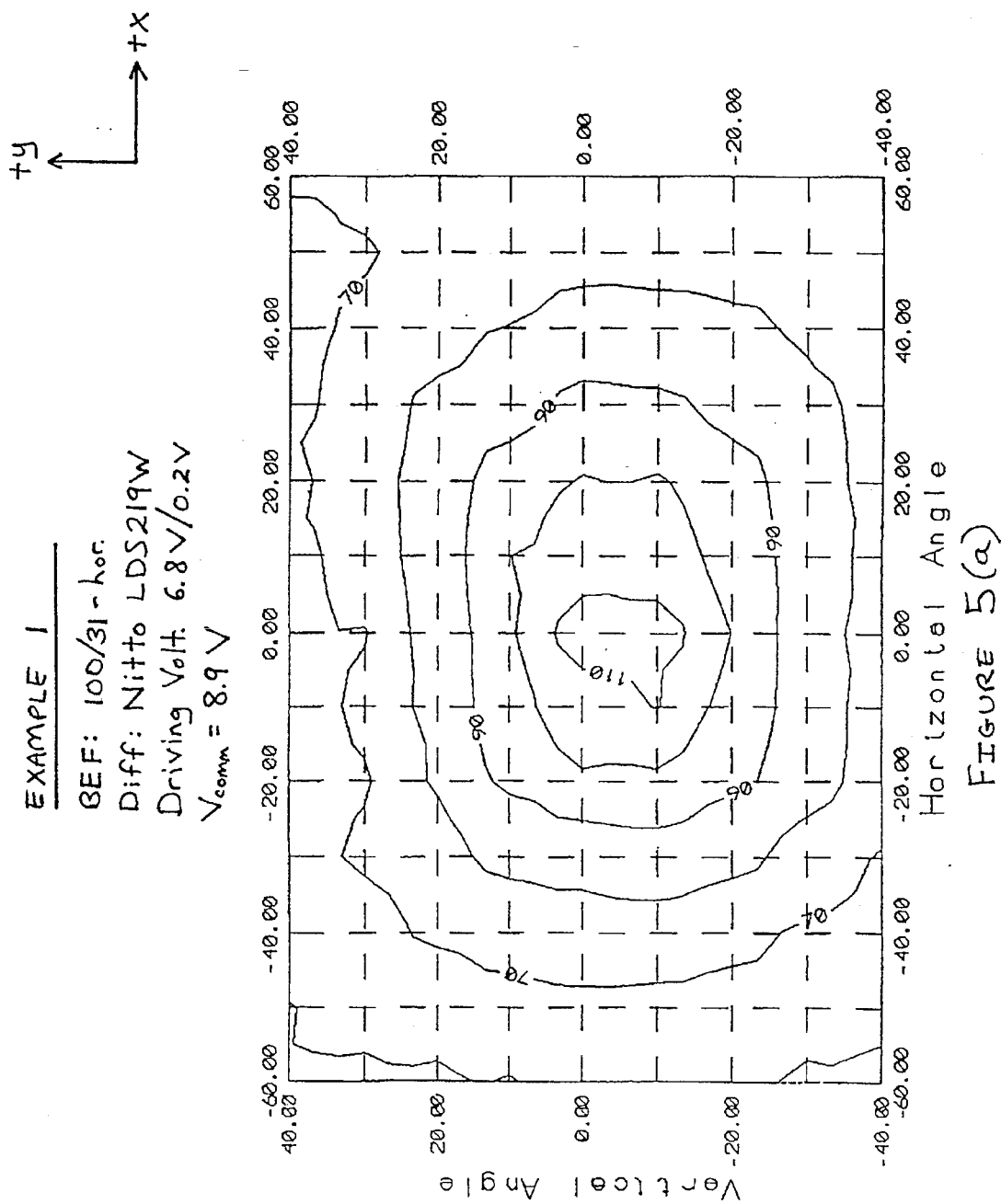
FIG. 5(a) is the contrast ratio curve graph or plot of the AMLCD of Example 1 including the diffuser and corresponding optical film. This and all other contrast ratio plots herein was measured using white light.

FIG. 8 is the intensity versus driving voltage plot illustrating the intensity at a variety of horizontal viewing angles along the 0° vertical axis of the Example 1 AMLCD having both a diffuser and adjacent optical faceted film (see FIGS. 5(a) and 6).

Figure 9:
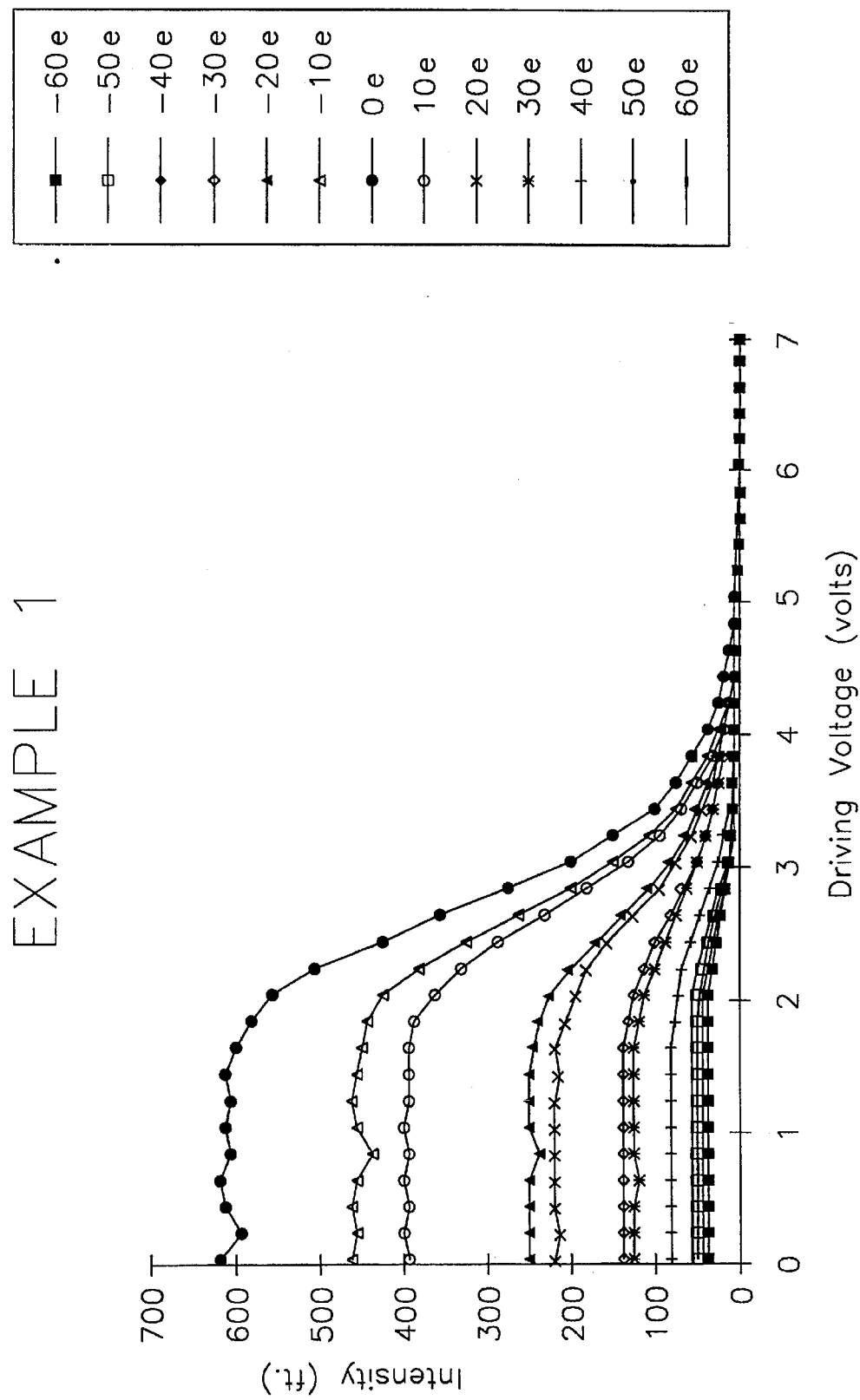

FIG. 9 is the intensity versus driving voltage plot illustrating the intensity at a variety of horizontal viewing angles along the 0° vertical axis of the Example 1 AMLCD having no optical film disposed adjacent the diffuser (see FIG. 7).

Figure 10:
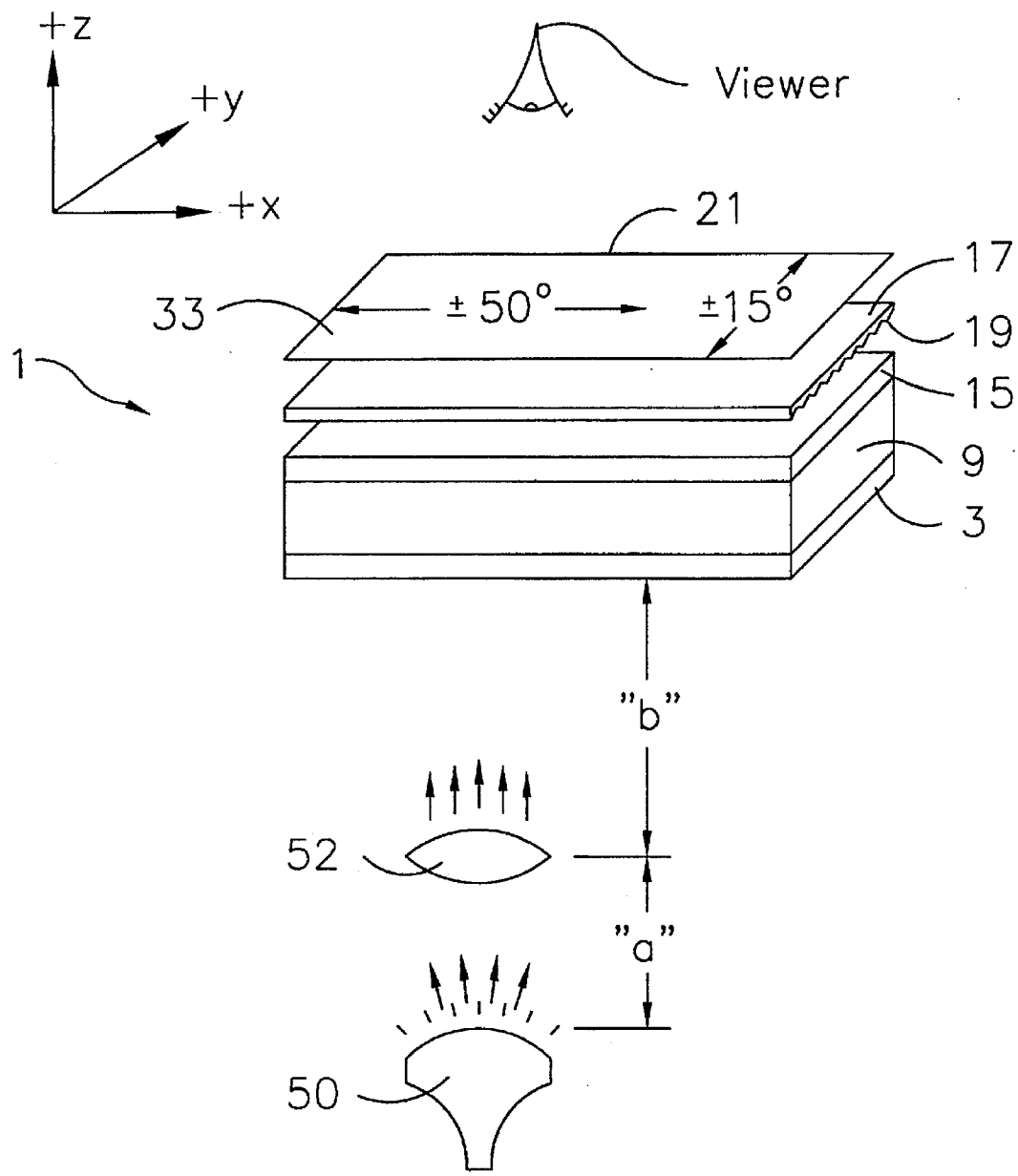

FIG. 10 is an exploded perspective view of the backlit AMLCD of Example 2.

Figure 11:
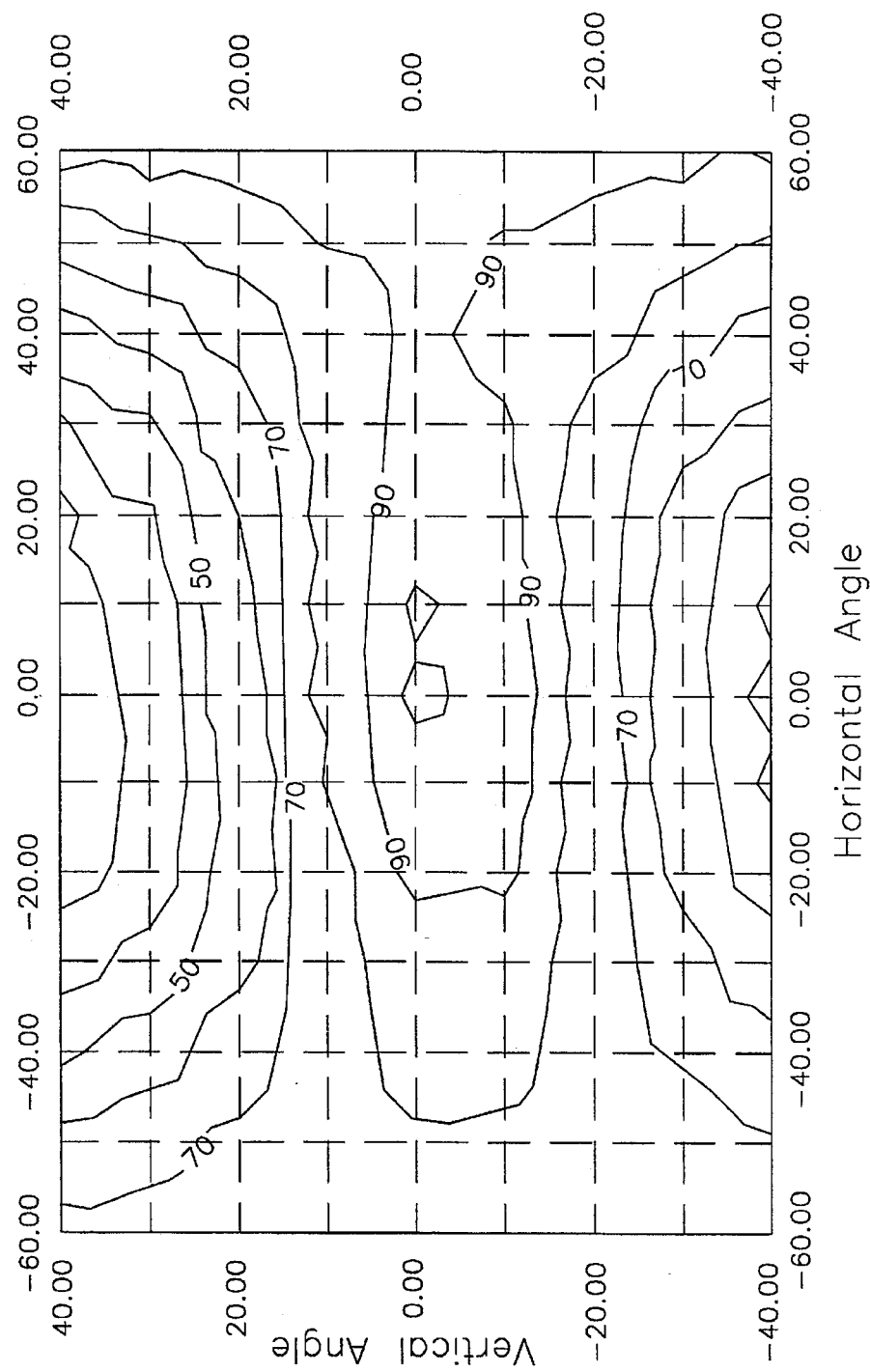

FIG. 11 is the contrast ratio curve graph or plot of the backlit AMLCD of Example 2.

Figure 12:
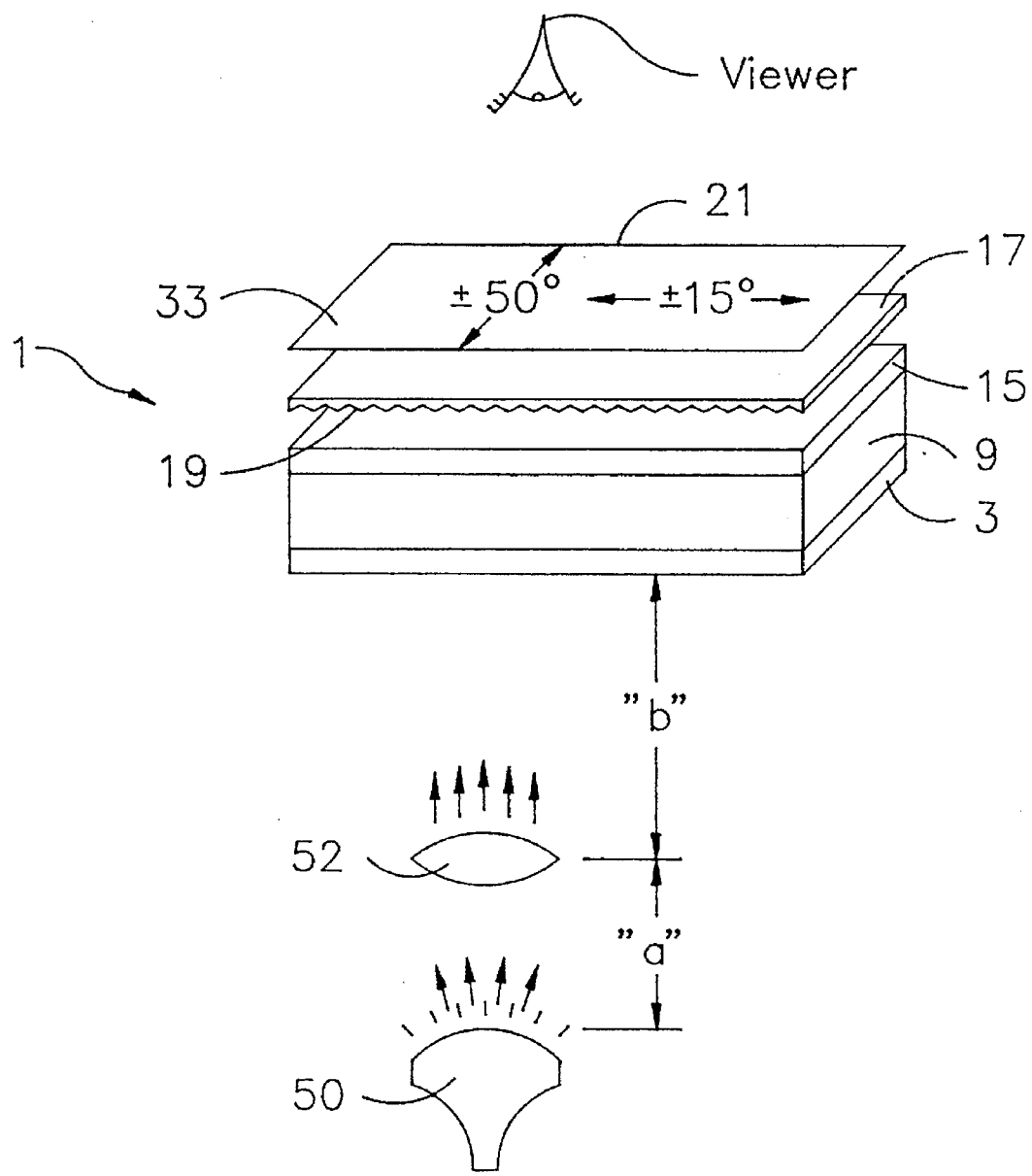

FIG. 12 is an exploded perspective view of the backlit AMLCD of Example 3.

Figure 13:
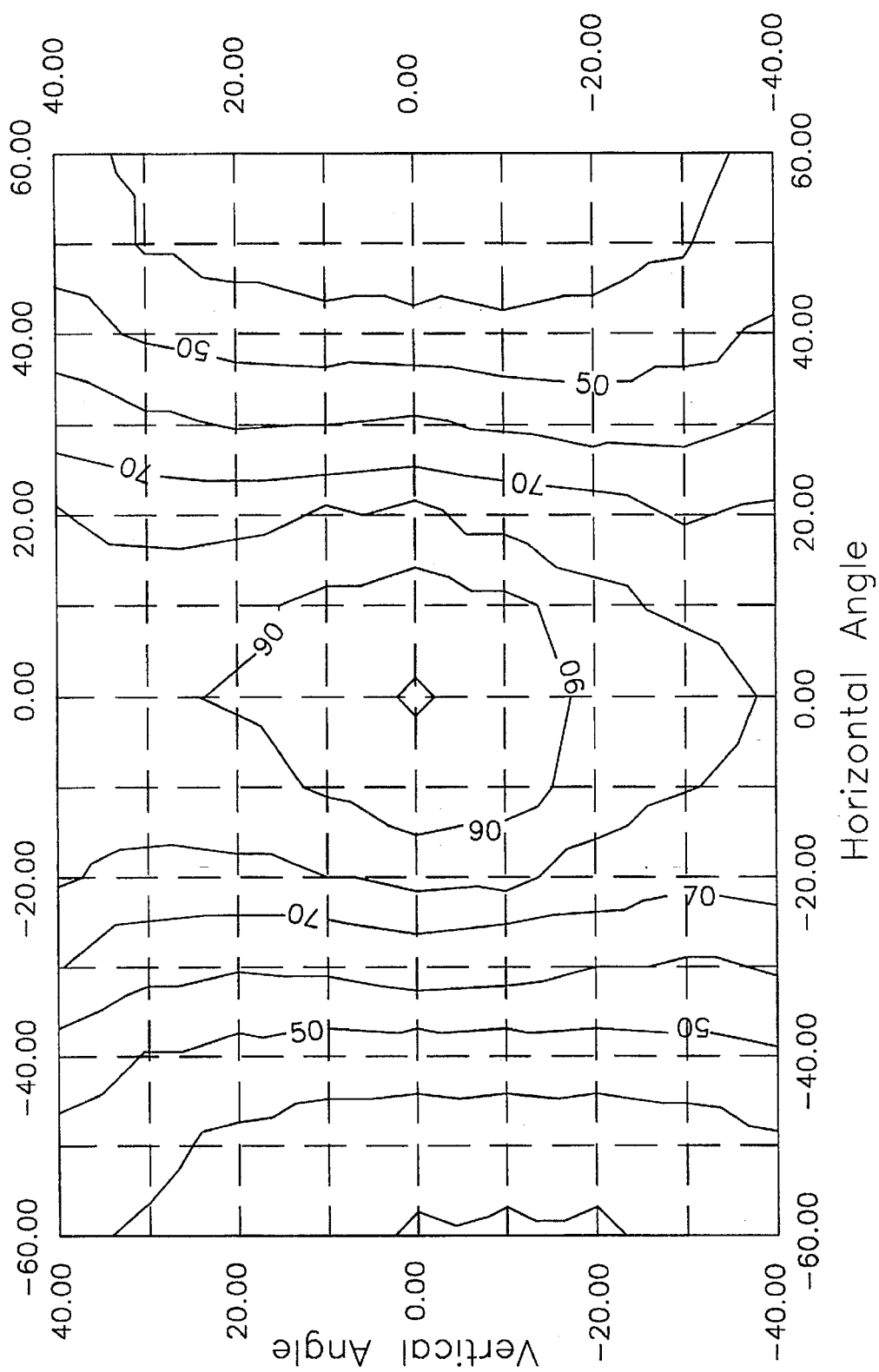

FIG. 13 is the contrast ratio curve graph of the backlit AMLCD of Example 3.

Figure 14:
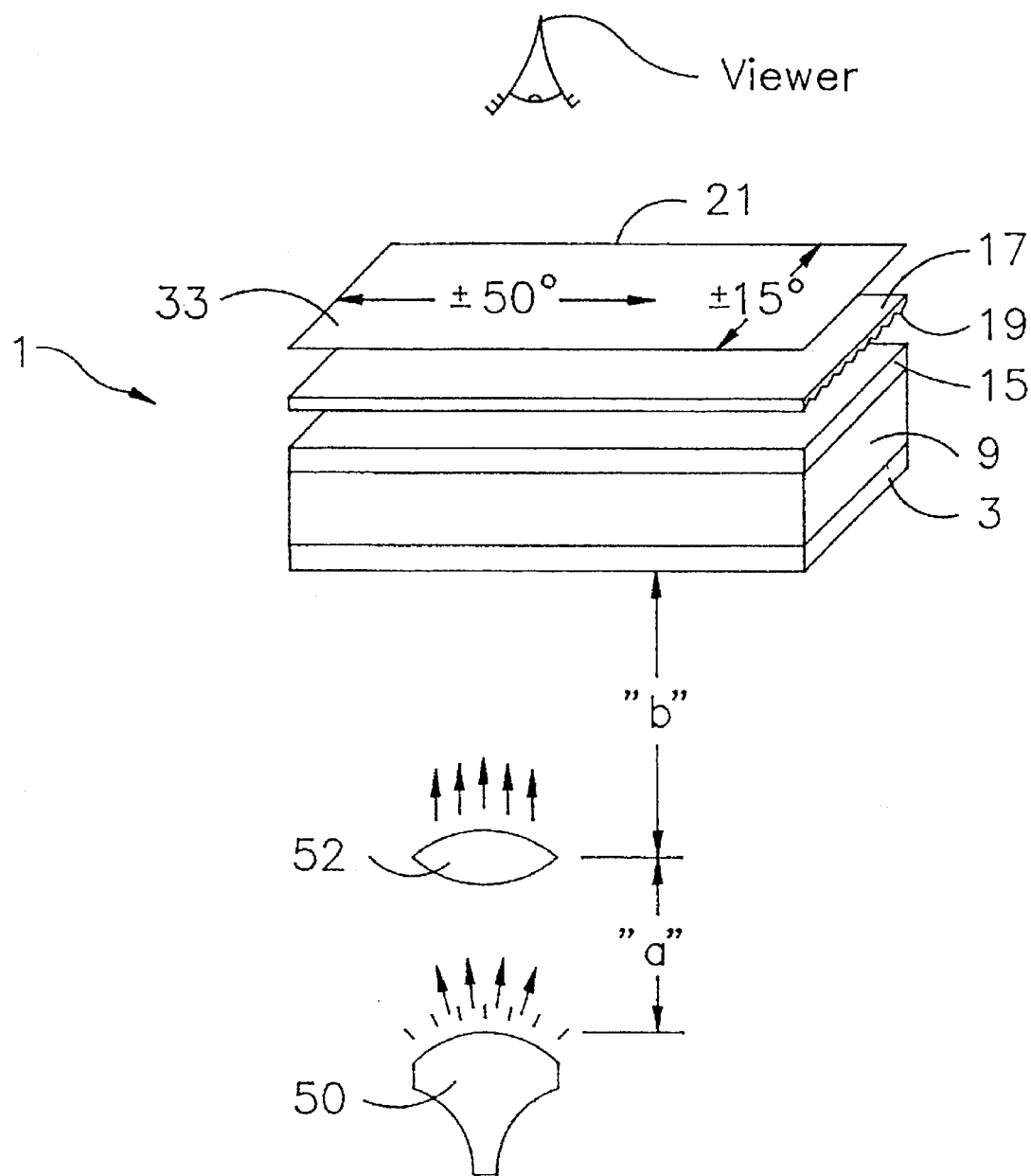

FIG. 14 is an exploded perspective view of the backlit AMLCD of Example 4.

Figure 15:
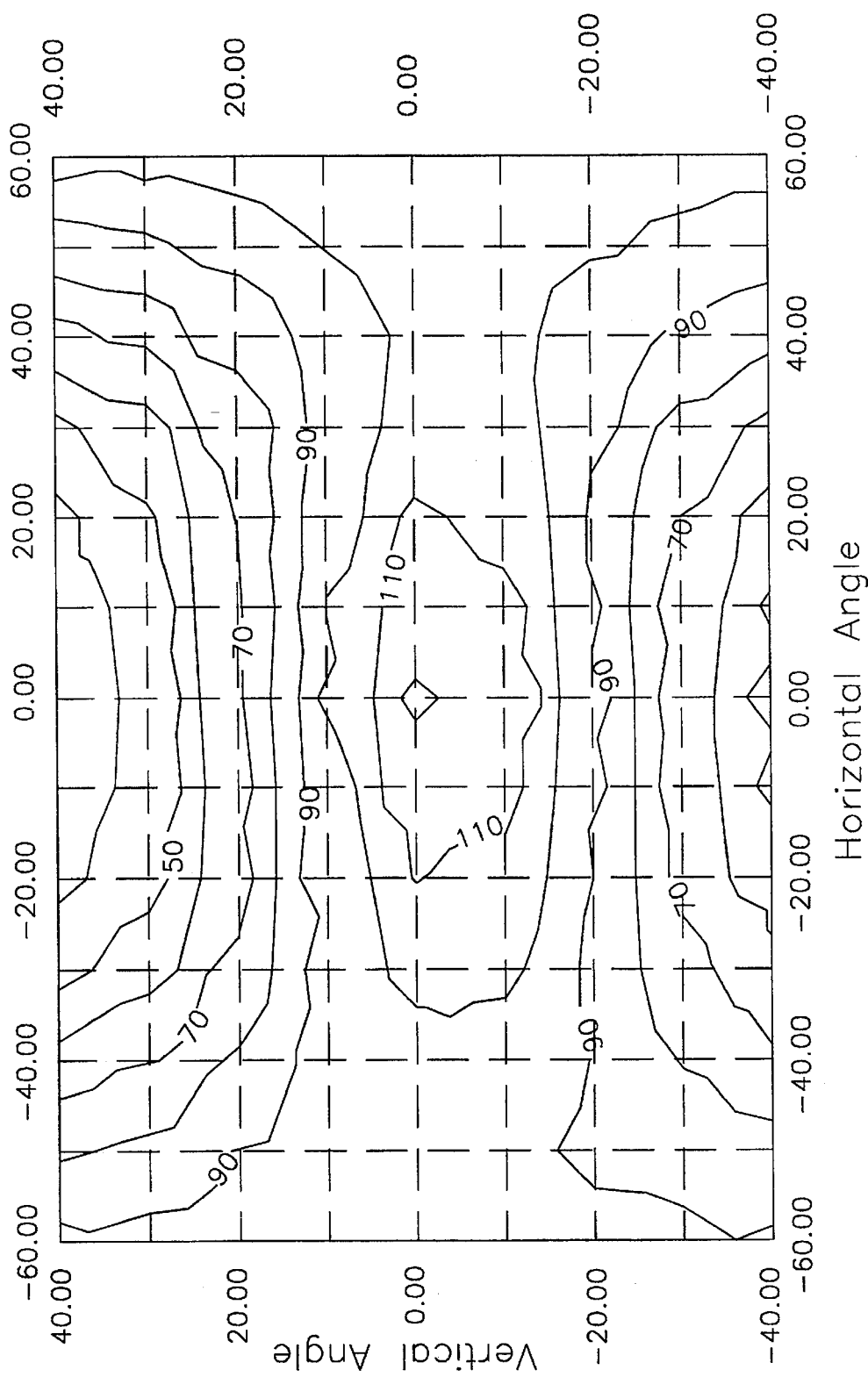

FIG. 15 is the contrast ratio curve graph of the backlit AMLCD of Example 4.

Figure 16:
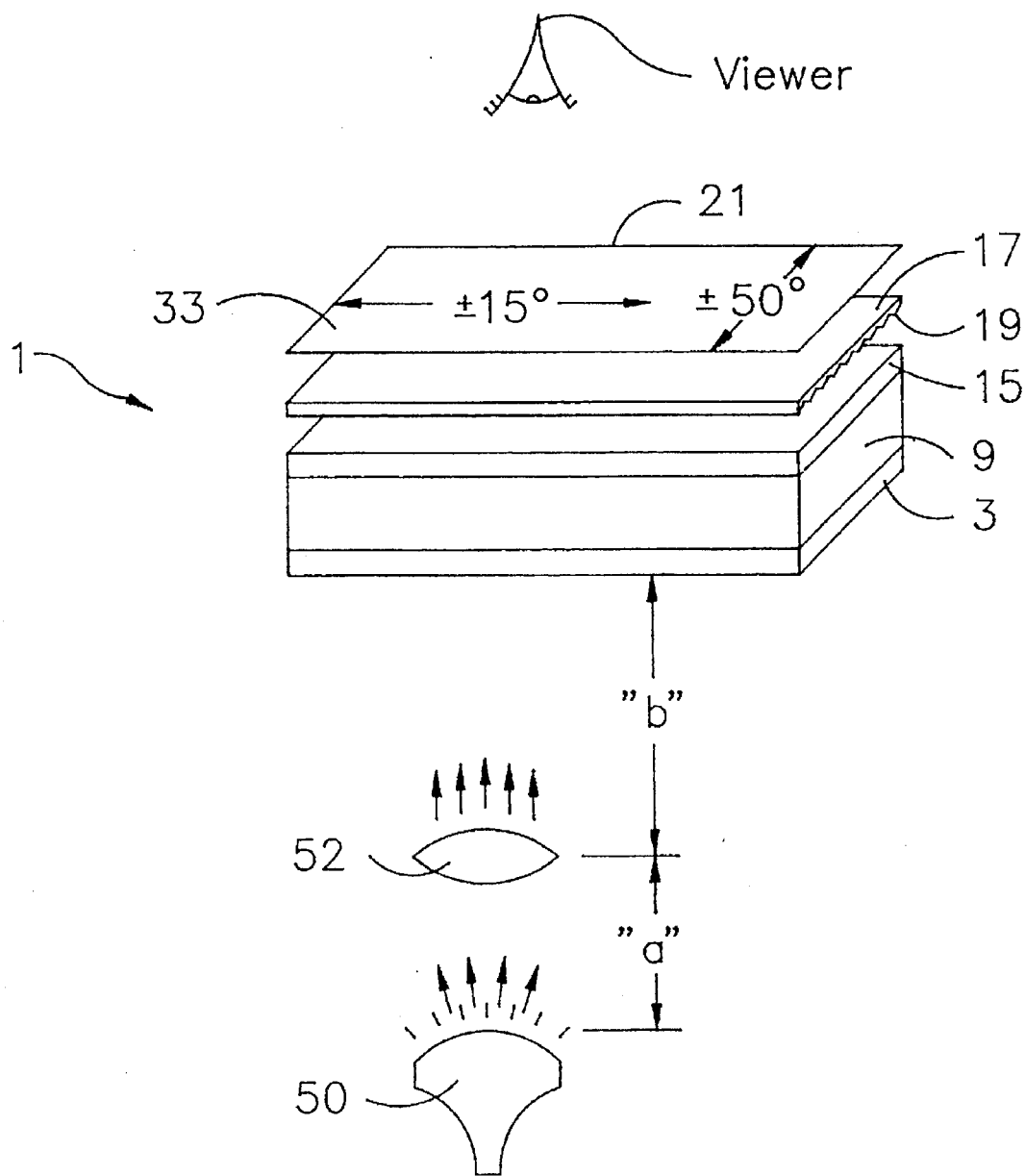

FIG. 16 is an exploded perspective view of the backlit AMLCD of Example 5.

Figure 17:
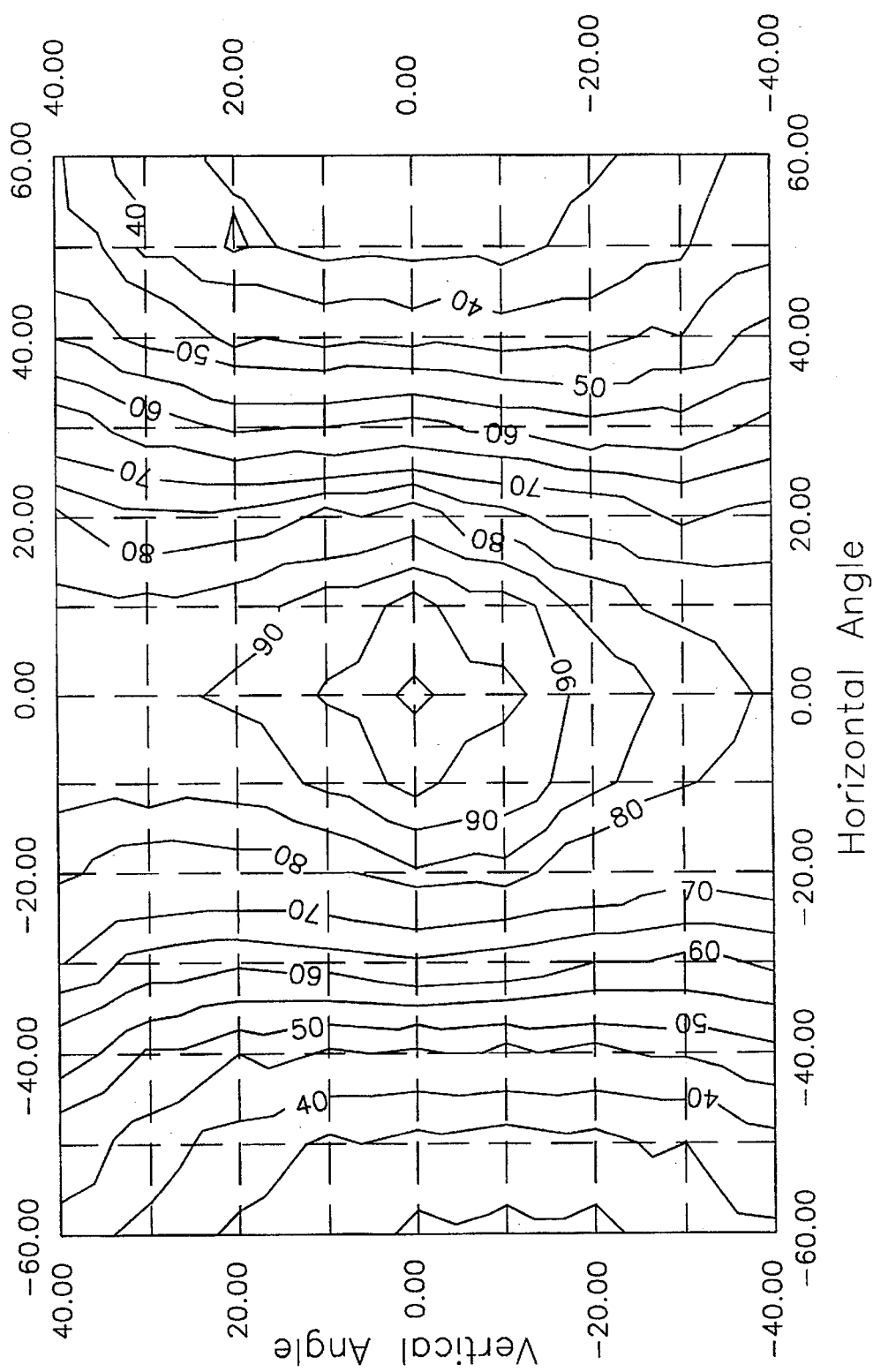

FIG. 17 is the contrast ratio curve graph or plot of the backlit AMLCD of Example 5.

Figure 18:
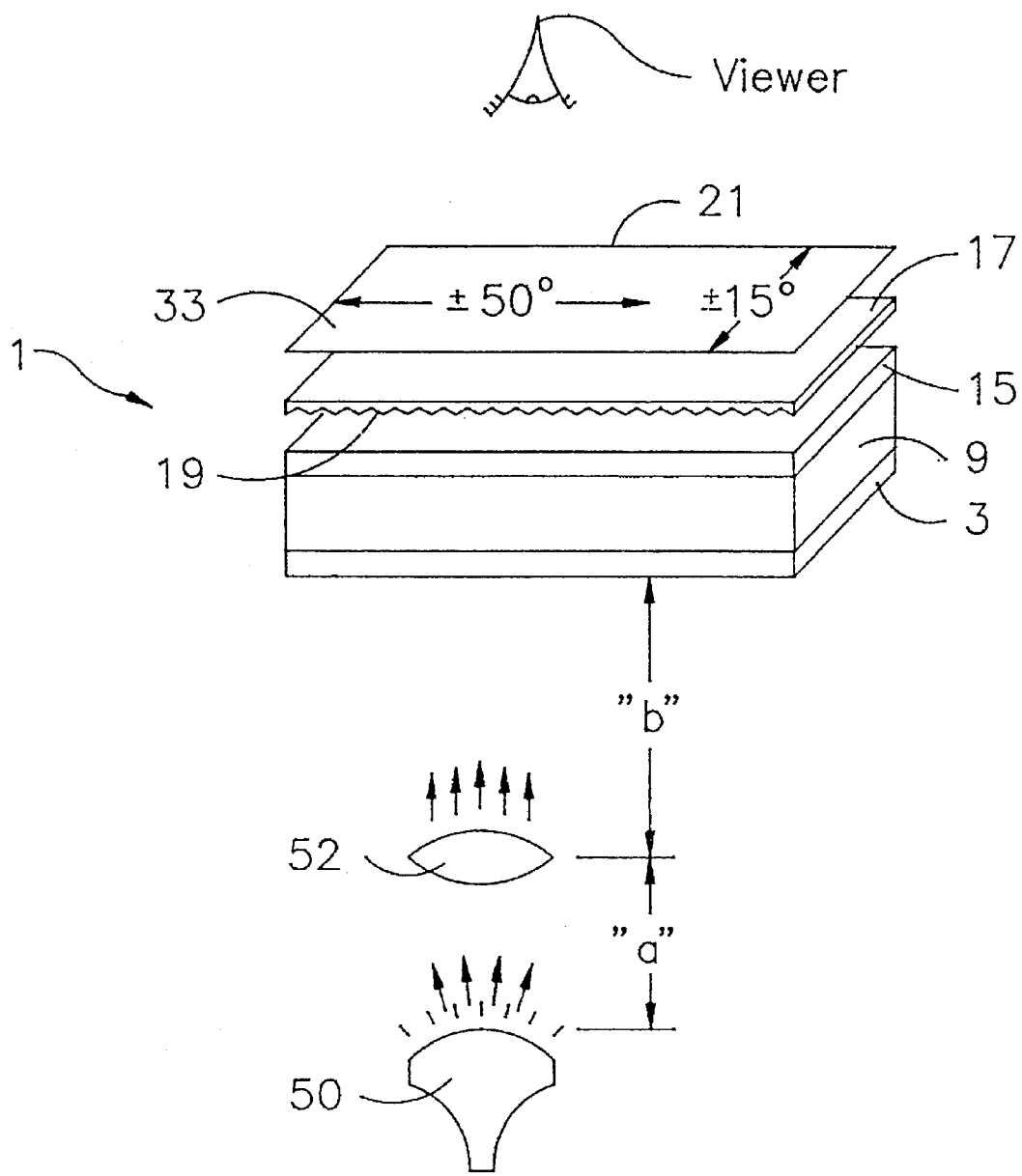

FIG. 18 is an exploded perspective view of the backlit AMLCD of Example 6.

Figure 19:
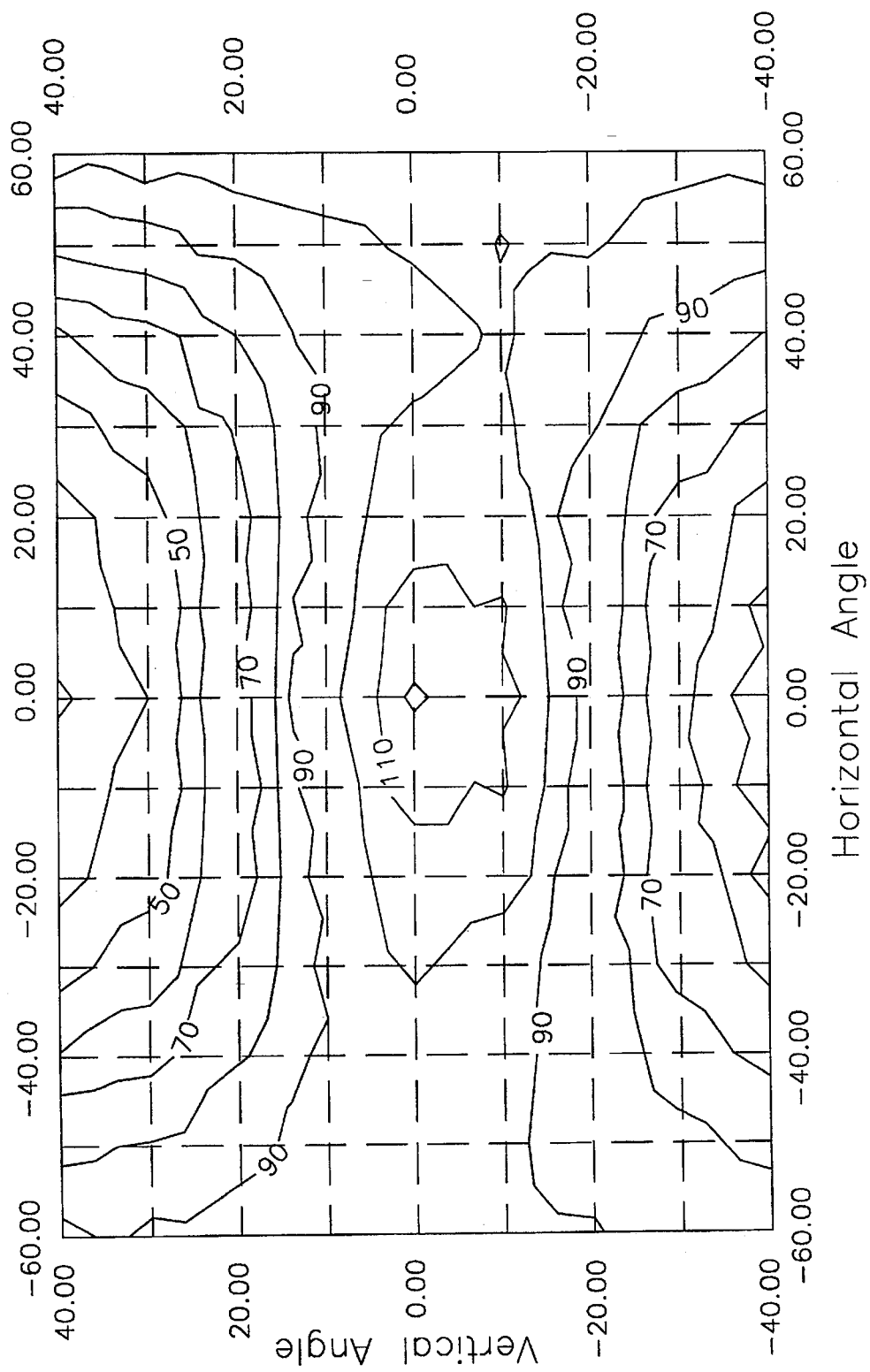

FIG. 19 is the contrast ratio curve plot of the backlit AMLCD of Example 6.

Figure 20:
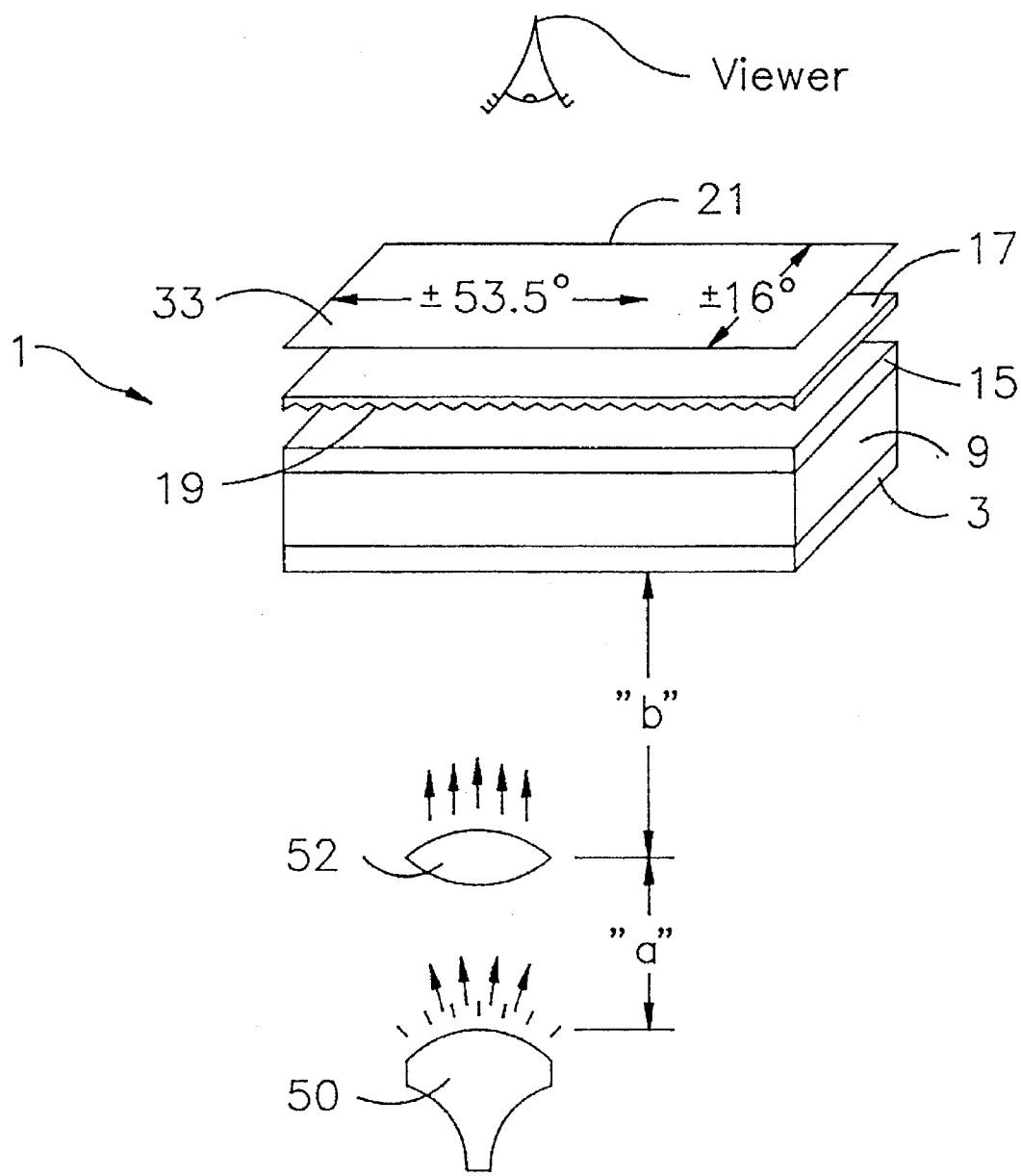

FIG. 20 is an exploded perspective view of the backlit AMLCD of Example 7.

Figure 21:
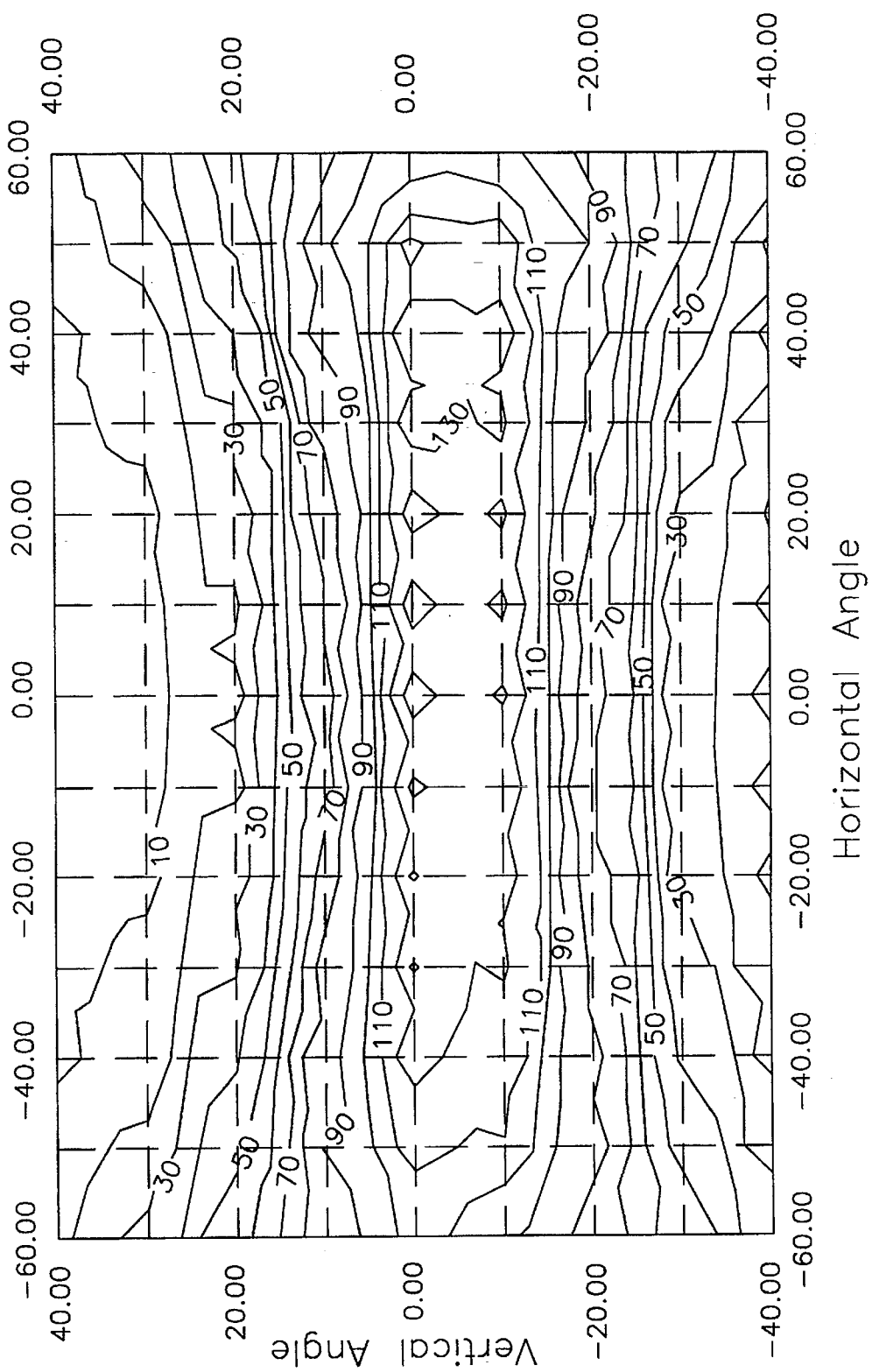

FIG. 21 is the contrast ratio curve plot of the backlit AMLCD of Example 7.

Figure 22:
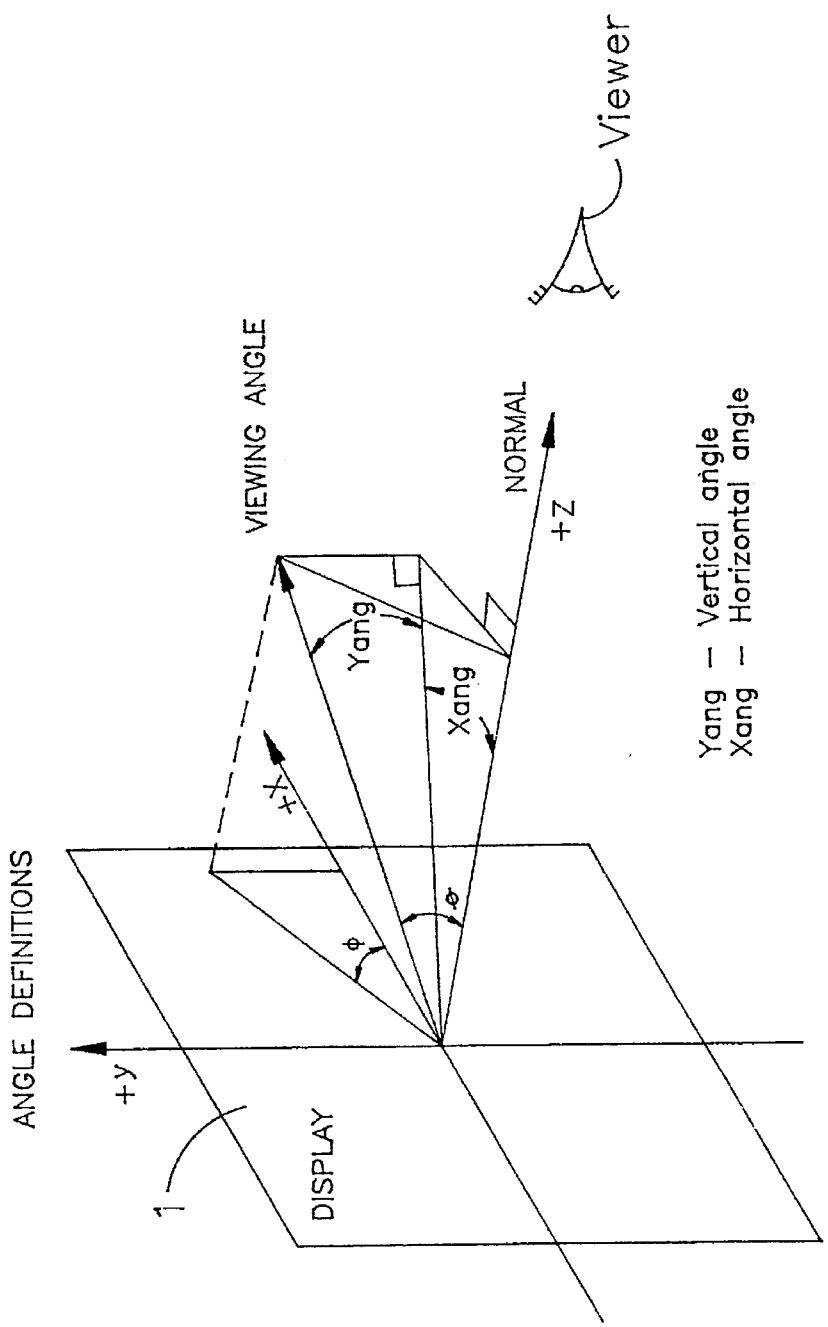

FIG. 22 is a graph illustrating the angular relationship between the horizontal and vertical viewing angles discussed herein, and their relationship with the conventional liquid crystal display viewing angles $\phi$ and $\Theta$.

Figure 23:
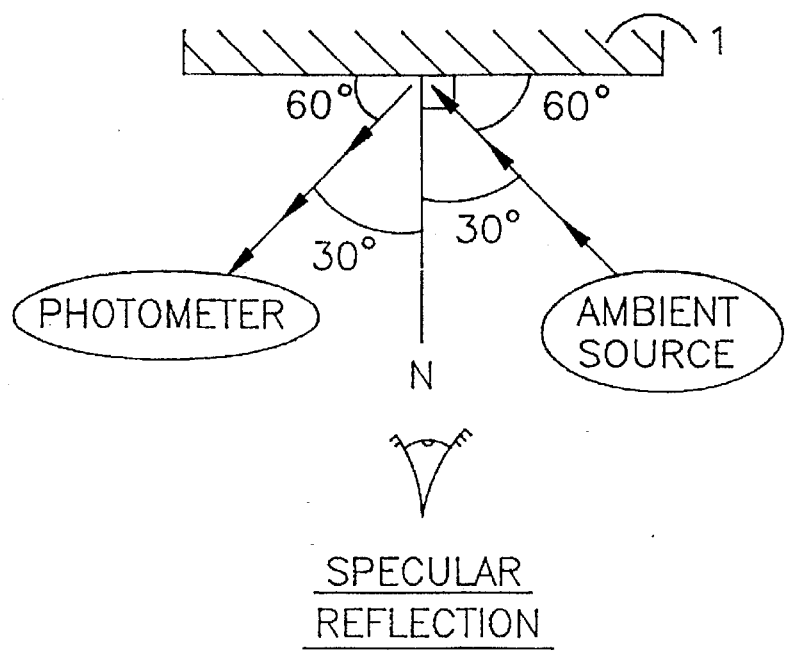

FIG. 23 is a schematic diagram illustrating the meaning and definition of the term "specular reflection" as used herein, this definition also being the conventional meaning of the term.

Figure 24:
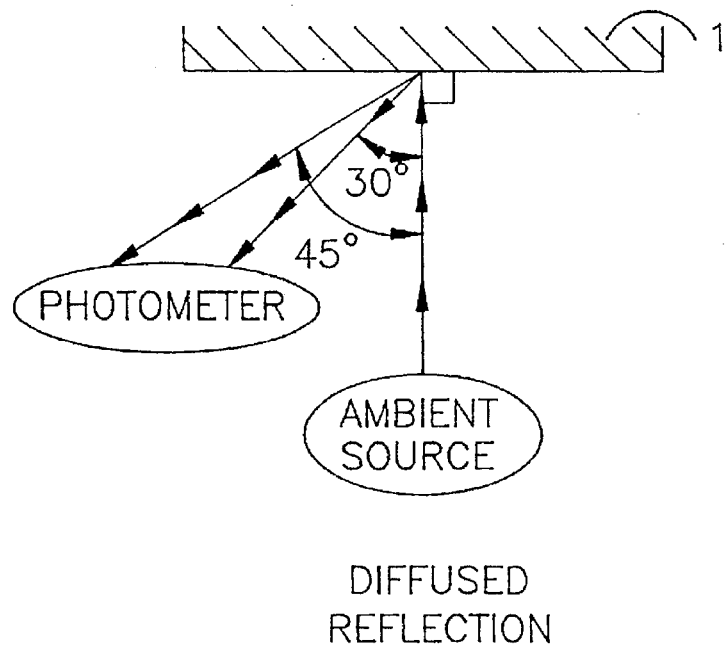

FIG. 24 is a schematic diagram illustrating the meaning and definition of the term "diffused reflection" as used herein, this definition also being the conventional meaning of the term.

DETAILED DESCRIPTION OF CERTAIN EMBODIMENTS OF THIS INVENTION

All liquid crystal displays discussed herein include liquid crystal material with a birefringence ($\Delta n$) of 0.084 at room temperature unless otherwise specified, this LC material being Model No. ZLI-4718 obtained from Merck.

The term "exterior" when used herein to describe a surface or side of an element, means the surface or side furthest from the liquid crystal material.

FIG. 22 illustrates the angular relationships between the horizontal and vertical viewing axes and viewing angles described herein relative to a liquid crystal display panel and conventional LCD angles $\phi$ and $\Theta$. The +X, +Y, and +Z axes shown in FIG. 22 are also defined in other figures herein. Furthermore, the "horizontal viewing angles" (or $X_{ang}$) and "vertical viewing angles" (or $Y_{ang}$) illustrated and described herein may be transformed to conventional LCD angles $\phi$ and $\Theta$ by the following equations:

$$\text{Tan } (X_{ang}) = \text{Cos } (\phi) \cdot \text{Tan } (\Theta)$$

$$\text{Sin } (Y_{ang}) = \text{Sin } (\Theta) \cdot \text{Sin } (\phi)$$

or $$\text{Cos } (\Theta) = \text{Cos } (Y_{ang}) \cdot \text{Cos } (X_{ang})$$

$$\text{Tan } (\phi) = \text{Tan } (Y_{ang}) \div \text{Sin } (X_{ang})$$

FIG. 23 defines what is meant herein by the term "specular reflection" with respect to ambient light. As shown, an ambient light source or glare source (e.g. a lamp) directs light toward display panel 1 from a predetermined horizontal angle relative to normal, i.e. 30° in this example. A photometer is positioned so as to receive reflected ambient light from the ambient source by way of display panel 1. The photometer is positioned at the same predetermined angle from normal, or 30° in this example, but on the opposite side of normal with respect to the ambient source. The photometer and ambient source are both along the 0° vertical axis. The ambient source and photometer are, of course, disposed in the same horizontal plane and are angularly offset from normal about opposite sides thereof at equivalent angles. For example, if the ambient source outputs 100 fL of light towards display panel 1 and the photometer of FIG. 23 picks up 2 fL off of panel 1, then the specular 30° reflection of the display panel is 2%.

FIG. 24 illustrates what is meant herein by the term "diffused reflection" with respect to ambient light. An ambient light source (e.g. the sun) is disposed at normal or within a few degrees thereof (e.g. −2° vertical, 0° horizontal) relative to display panel 1 and directs a predetermined intensity of light at the panel. A photometer, horizontally co-planar with the ambient source, is disposed at a predetermined horizontal angle relative to the ambient source, either 30° or 45° in this FIG. 24 example. The amount or intensity of light picked up by the photometer at a predetermined angle dictates the diffused reflectivity of display panel 1 for that particular angle. For example, if the ambient light source in FIG. 24 directs 100 fL towards display panel 1, and the photometer, offset 30° from the ambient source, picks up 4 fL off of display panel 1, then the display has a diffused 30° reflection or reflectance of 4%. Alternatively, if the photometer is positioned 45° relative to the ambient source and picks up 2 fL, then the display panel has a diffused 45° reflection of 2%.

Accordingly, FIGS. 23–24 define the terms "specular reflection" and "diffused reflection" as used herein unless otherwise specified. These are, of course, the conventional definitions of both specular and diffused reflection in the liquid crystal display art. See, for example, MIL-L-85762a.

Figure 1A:
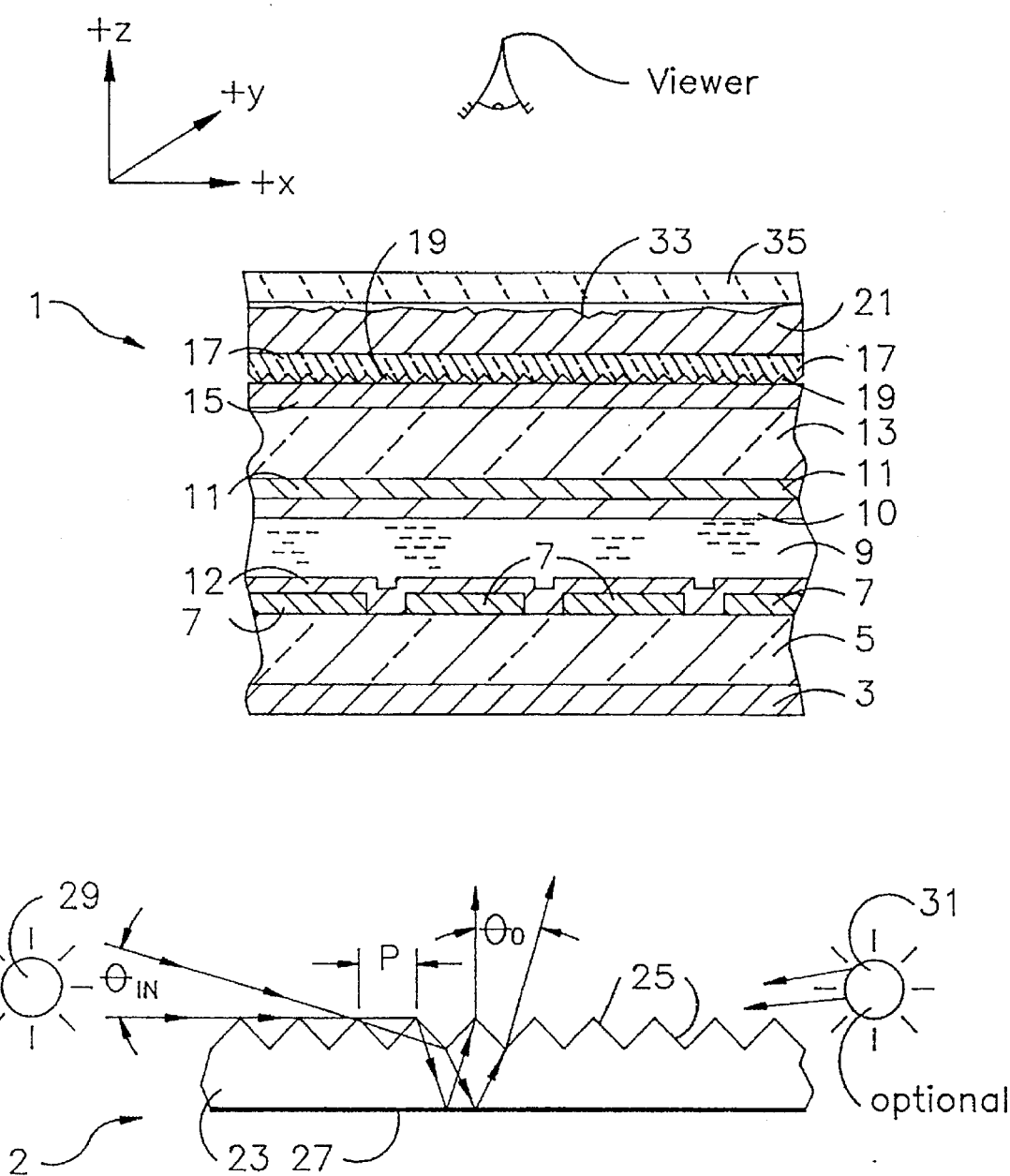
FIG. 1(a) is a side elevational cross sectional view of a backlit liquid crystal display assembly according to a first embodiment of this invention, including a diffuser and optical film positioned exterior the front polarizer.

Referring now more particularly to FIG. 1(a) there is illustrated a side elevational cross sectional view of a liquid crystal display assembly according to a first embodiment of this invention, including display panel 1, and backlighting assembly 2.

Display panel 1 includes from the rear forward toward the viewer, rear or entrance linear polarizer 3, transparent substrate 5 preferably made of glass or plastic, individual pixel electrodes 7 defining a plurality of pixels or colored sub-pixels in panel 1, conventional liquid crystal layer 9 preferably but not necessarily of the twisted nematic type, common electrode 11, front transparent substrate 13 also preferably made of glass or plastic, conventional front linear polarizer 15, optical film 17 including a plurality of optical facets 19, diffuser 21, and finally optional glass sheet 35 including an anti-reflective (AR) coating on the exterior surface thereof.

Backlight assembly 2 includes optical film 23 including a plurality of facets 25 defined in its surface facing display panel 1, and reflective layer 27 disposed on the flat or exterior surface of optical film 23. Layer 27 is preferably made of a reflective metal, such as aluminum, while optical film 23 is preferably "Right Angle Film" or "RAF" manufactured and commercially available from 3M, St. Paul, Minn.

Alternatively, a backlight using "TRAF" optical film commercially available from 3M could also be utilized to provided substantially collimated backlight to the display panel. When using "TRAF" in the backlight, TRAF being a faceted polycarbonate film, the facets thereof face away from the display panel. An edge mounted source positioned below the TRAF emits light rays first onto the facets, the facets directing the light upward through the facet side of the TRAF toward the display panel. See "3M/Optical Systems Right Angle Backlighting Technology Design Aid", the disclosure of which is incorporated herein by reference, with respect to how TRAF and RAF are utilized in backlights.

Right angle film 23 and the optical design of facets 25 allow light source 29, and optionally source 31, to be edge mounted with respect to film 23 thereby thinning the overall profile of the display assembly. Backlighting lamps 29 and 31 are disposed slightly above the faceted surface of right angle film 23 so as to direct light downward onto and through facets 25. The light emitted from sources 29 and 31, when reaching facets 25 of film 23, is reflected by facets 25 in a direction away from display panel 1 and toward reflective surface 27. Upon reaching surface 27, the light emitted from lamps 29 and 31 is reflected upward toward display panel 1 through facets 25. The end result is substantially collimated light or light rays directed toward display panel 1.

Alternatively, the collimating backlight of U.S. Pat. No. 5,161,041, the disclosure of which is hereby incorporated herein by reference, may also be used (with pre and/or post-film diffusers) to provide or direct substantially collimated backlight towards display panel 1 in this and other embodiments of this invention.

Linear polarizers 3 and 15 of display panel 1 are conventional in nature and have transmission axes which may either be substantially parallel or substantially perpendicular with respect to one another, depending upon the desired characteristics of the display. If, for example, a normally white (NW) twisted nematic display is desired, then the transmission axes of linear polarizers 3 and 15 will be oriented substantially perpendicular to one another thereby allowing the light entering display panel 1 from backlight assembly 2 to be twisted about 90° by liquid crystal layer 9 when in the off state and exit display panel 1 via front linear polarizer 15. In other words, such a perpendicular orientation of the transmission axes of polarizers 3 and 15 renders display panel 1 normally white.

Normally white displays, while in the off or unenergized state, allow light from their backlight assembly to be transmitted therethrough thus reaching the viewer. However, when the liquid crystal material of a normally white twisted nematic display is energized, the substantially perpendicular nature of the display's polarizer transmission axes act to block substantially all light from being transmitted therethrough and reaching the viewer. Hence, when the LC layer of a normally white display is energized fully, no light preferably reaches the viewer and the display appears darkened, but the same display appears lightened when no or substantially little voltage is applied across the same liquid crystal layer.

In the case where a user desires, for example, a normally black TN liquid crystal display, the transmission axes of polarizers 3 and 15 are oriented substantially parallel to one another so as to render the display panel normally black. In a normally black TN display, when liquid crystal layer 9 is energized by way of electrodes 7 and 11, light is permitted to be transmitted through panel 1 and reach the viewer. However, when such a normally black display is in its off state, i.e. when a voltage below the threshold value is applied to liquid crystal layer 9 via electrodes 7 and 11, liquid crystal layer 9 acts to twist the light entering display panel 1 via polarizer 3 about 90° so that it is prevented from exiting panel 1 by polarizer 15. In other words, when a normally black display is in the off state, panel 1 appears darkened to the viewer, and when in its on state, light is transmitted therethrough so as to selectively display an image to the viewer. In both normally white and normally black TN displays, particular pixels are selectively energized or deenergized so as to provide a variable or predetermined image to the viewer.

Conventional substantially transparent electrodes 7 and 11 sandwich liquid crystal layer 9 therebetween. Each pixel electrode 7 defines an individual pixel or colored (e.g. red, green, or blue) subpixel. Accordingly, each subpixel or pixel defined by an electrode 7 may be individually energized or deenergized while its adjacent pixel or subpixel remains unaffected due to the independent nature of electrodes 7. The display of this embodiment is preferably of the multicolored TN active matrix type, but could also be of the passive type, STN type, etc.

Each colored subpixel defined by an electrode 7 preferably includes a color filter (not shown) disposed therein, the color filter preferably being red, green, or blue with each pixel including three separate colored subpixels (i.e. one red, one green, and one blue) arranged in a triangular configuration.

A pair of conventional polyimide orientation films 10 and 12 are disposed interior of electrodes 11 and 7 so as to abut liquid crystal layer 9. These orientation films are buffed or oriented in a conventional manner so that liquid crystal layer 9 is twisted about 90° in this embodiment when no or substantially little voltage is applied thereto (i.e. when panel 1 is in the "off state"). The buffing direction of orientation film 12 sandwiched between liquid crystal layer 9 and pixel electrodes 7 is preferably substantially parallel to the transmission axis direction of rear polarizer 3. Likewise, the buffing direction of orientation film 10 sandwiched between liquid crystal layer 9 and common electrode 11 is preferably substantially parallel to the transmission axis of front polarizer 15. These buffing and polarizer directions assume the LCD is NW, of course, in this embodiment. Therefore, the buffing directions of the two orientation films are substantially perpendicular to one another, while the transmission axes of polarizers 3 and 15 are also substantially perpendicular to one another, thereby defining a twisted nematic normally white AMLCD. However, each buffing direction could be shifted 90°, or in any other conventional manner.

Liquid crystal material 9 is preferably Model No. ZLI-4718, commercially available from Merck, and occupies a cell gap "d" of about 5.0–6.0 µm in a preferred embodiment of this invention.

Optical faceted film 17 in this embodiment is disposed exterior or along the exterior surface of front polarizer 15 so as to be disposed between the viewer and liquid crystal layer 9. Optical film 17 is preferably "Brightness Enhancement Film" or "BEF" commercially available from 3M, St. Paul, Minn. BEF is described in a brochure published by 3M entitled "3M Brightness Enhancement Film (BEF)" the disclosure of which is hereby incorporated herein by reference.

Optical film 17 includes a plurality of optical facets 19 disposed on one surface thereof, while the film's opposite surface is substantially flat in nature, film 17 made of, for example, a polycarbonate. Facets 19 may be either symmetrical or non-symmetrical relative to one another, depending upon the displays desired results.

While the supplier (3M) of BEF suggests that it be used such that facets 19 face away from incoming light in LCD backlights thereby allowing the BEF to act as a collimator, certain embodiments of this invention use directly the opposite approach and orient BEF 17 such that facets 19 face LC layer 9 and, therefore, face the incoming light emitted from the backlight.

In this particular embodiment, facets 19 of film 17 face liquid crystal layer 9 and abut or nearly abut the exterior surface of front polarizer 15. Therefore, the light emitted from backlight assembly 2, after being transmitted through liquid crystal layer 9 and polarizer 15, first hits facets 19 of optical film 17 before proceeding through the remainder of film 17 and reaching diffuser 21. It is believed that facets 19 of BEF 17, when facing liquid crystal layer 9 as shown in FIG. 1(a), act to provide a refracting or dispersing effect on the light exiting polarizer 15.

It is also believed that BEF 17 substantially collimates ambient light (e.g. sunlight) hitting the front panel of the display, thereby directing the ambient light directly into the panel. This substantial collimation of ambient light going into the panel substantially reduces the specular and diffused ambient reflection percentage of the display panels of the various embodiments of this invention. The manner in which film 17 is believed to substantially collimate the ambient light is more thoroughly described in U.S. Pat. No. 5,161,041, incorporated herein by reference, the ambient light first hitting the flat surface of film 17 and then proceeding toward facets 19, facets 19 along with the flat surface substantially collimating the light as it heads toward the LC layer.

Therefore, film 17 acts to both collimate the ambient light so as to reduce reflection off of the display panel, and refract the backlight rays after they proceed through the LC layer.

While the precise mechanism by which film 17 works is not entirely understood, it is clear that by the use of this film oriented in a manner such that facets 19 face liquid crystal layer 9, with or without diffuser 21, a unique result is achieved. The uniqueness resides in the improvement of the displays' viewing characteristics by substantially enlarging the viewing envelope and increasing its uniformity with respect to resolution, ambient light reflection, inversion (i.e. lack of), etc.

The simple provision of film 17 either exterior or interior polarizer 15 provides the display with improved viewing characteristics with respect to reflection, color shifts, and resolution over a wide range of viewing angles. In this respect, diffuser 21 is optional.

Alternatively, two faceted films 17 could be provided instead of one, with the facet directions being either substantially parallel or perpendicular to one another. For Example, two separate BEFs 17 could be disposed between diffuser 21 and liquid crystal layer 19, with the facets of both films 17 facing LC layer 9 and being substantially perpendicular to one another. These two films 17 could be disposed either interior or exterior polarizer 15.

Optical film 17 may be mounted or affixed to display panel 1 in a variety of manners. One such way in which to mount film 17 and diffuser 21 on the exterior surface of polarizer 15 as shown in FIG. 1(a) is to dispose conventional index matching oil (e.g. 1.470) between polarizer 15 and film 17 thereby filling-in the gaps created by facets 19. The same or a similar (e.g. about 1.58) index matching oil may also be provided between the adjacent abutting substantially flat surfaces of diffuser 21 and film 17. If such index matching oil is used, film 17 and diffuser 21 are preferably compression mounted to display panel 1 and polarizer 15 by way of a conventional clamping mechanism, such as conventional tape, the tape being disposed outside of the viewing area of the panel.

Alternatively, a conventional index matching adhesive (not shown) may be provided on both sides of optical film 17 so as to adhere film 17 to both polarizer 15 and diffuser 21. In such a case, the adhesive may fill-in the gaps created by facets 19 between film 17 and polarizer 15, although the gaps need not be fully filled in certain embodiments of this invention.

The index of the aforesaid index matching oil or adhesive may, of course, be varied so as to achieve desired viewing characteristics of display panel 1. In one preferred embodiment of this invention, conventional 1.470 index matched oil was disposed on opposite sides of optical BEF 17 adjacent both polarizer 15 and diffuser 21, the index of refraction of BEF 17 being 1.586.

Optionally, an amount of index matching oil or adhesive may be provided between polarizer 15 and BEF 17 such that the gaps created by facets 19 are only partially filled.

While BEF by 3M is preferably used as film 17 in this embodiment, other conventional faceted films or refracting/collimating elements which achieve the aforesaid results may also be utilized. One example of such an alternative film is "OLF" or "Optical Lighting Film" commercially available from 3M. Thus, any faceted structure whose facets are of an appropriate geometric shape such that when employed in a position as shown or suggested herein result in improved uniformity with respect to resolution, ambient reflection, or contrast, etc. may be utilized according to the teachings of this invention.

Diffuser 21, mounted exterior optical faceted film 17 in this FIG. 1(a) embodiment, preferably has its roughened or light scattering surface 33 facing the viewer, or being furthest away from liquid crystal layer 9. However, this display will still exhibit good viewing characteristics if the light scattering surface of the diffuser faces the LC material. Diffuser 21 may be, for example, of the holographic, gelatin, or other conventional type. Optionally, more than one diffuser may be provided exterior BEF 17.

In certain preferred embodiments of this invention, diffuser 21 is a holographic diffuser commercially available from POC Physical Optics Corporation, Torrance, Calif. In other preferred embodiments of this invention, diffuser 21 is a gelatin diffuser/filter encapsulated by two pieces of glass, S/N 105-41B, obtained from Kaiser Optical Systems, Ann Arbor, Mich., this holographic diffuser being valued at 107°/32°, i.e. 107°×32°. In other preferred embodiments of this invention, diffuser 21 may be Model No. LDS219W, commercially available from Nitto Corporation, Japan, or Nitto Denko America, Inc., New Brunswick, N.J. Preferably, no matter what type of diffuser 21 (any conventional diffuser is believed to be adequate) is used in panel 1, roughened or light scattering surface 33 (if the diffuser being utilized has one) thereof preferably faces the viewer or the direction away from liquid crystal layer 9.

Alternatively, roughened diffuser surface 33 may face liquid crystal layer 9 and abut the exterior surface of optical film 17, with the flat surface of diffuser 21 facing the viewer, although the opposite is preferred.

In a typical operation of the first embodiment display of this invention, shown in FIG. 1(a), light is originally emitted from edge-mounted backlighting sources 29 and 31, the light being directed toward the upper faceted surface of right angle film 23. When the light first reaches facets 25 of right angle film 23, it is deflected rearwardly toward reflective surface 27 in the direction away from liquid crystal layer 9 and panel 1. Upon reaching reflective surface 27, preferably an aluminum coating, the light from sources 29 and 31 is reflected thereby and directed upwardly toward facets 25 and display panel 1 as shown in FIG. 1(a). Upon reaching facets 25 for the second time, the light reflected by surface 27 is substantially collimated and directed towards panel 1 and rear polarizer 3 thereof.

The light emitted from backlighting assembly 2, upon reaching display panel 1, is linearly polarized by conventional linear polarizer 3. Accordingly, the now linearly polarized light proceeds from polarizer 3 through transparent substrate 5, transparent ITO pixel electrodes 7, and orientation film 12 until reaching liquid crystal layer 9.

Because liquid crystal layer 9 is twisted about 90° due to the buffing of orientation films 10 and 12, the linearly polarized light, after being transmitted through substrate 5 and pixel electrodes 7, is twisted about 90° by liquid crystal material/layer 9 as it proceeds therethrough when LC layer 9 is unenergized (i.e. when no voltage above the threshold voltage is applied thereacross by electrode 7 and 11). Alternatively, when a voltage via electrodes 7 and 11 is applied across liquid crystal layer 9, the linearly polarized light is substantially unaffected by passage through the liquid crystal layer and maintains its direction of polarization thus reaching and being transmitted through film 10, common electrode 11, and transparent substrate 13 with the same angular polarization given to it by polarizer 3.

Therefore, if linear polarizers 3 and 15 of a TN panel have crossed or substantially perpendicular transmission axes (NW), when a driving voltage is applied across liquid crystal layer 9, output or front polarizer 15 substantially blocks the linearly polarized light from being transmitted through display panel 1 toward the viewer. However, if no voltage or a voltage below $V_{th}$ is applied across LC layer 9, the linearly polarized light is twisted about 90° by liquid crystal layer 9 and its polarization direction when reaching output polarizer 15 substantially corresponds to the transmission axis of polarizer 15, thereby allowing the light to be substantially transmitted or pass through the front polarizer thus reaching optical faceted film 17 and diffuser 21.

Upon exiting front polarizer 15, the light which has been transmitted through display panel 1 up to this point is substantially collimated in nature as a result of the collimating effect of backlight assembly 2. This collimated light, upon reaching optical facets 19 of optical film 17, is optically altered by the facets, the alteration depending in part upon the index of the oil or adhesive disposed between facets 19 and polarizer 15 as well as the optical design of the facets themselves. It is recognized, of course, that no index matching oil or adhesive need be disposed within the gaps created by facets 19. It is believed that facets 19 of film 17 when facing LC layer 9 as shown in FIG. 1(a) substantially refract to some extent the collimated light emitted from exit polarizer 15 thereby scattering the directionality of such light. Therefore, it is believed that the image, after leaving film 17 is no longer collimated due to the effect of facets 19.

The refracted light then proceeds through the remainder of film 17 before entering optional diffuser 21, the flat surface of which either abuts the flat or exterior surface of film 17 or is disposed closely adjacent thereto when for example a conventional optical adhesive is disposed therebetween. The refracted or scattered light proceeds through optional diffuser 21 until reaching its light scattering or roughened surface 33, where it is diffused or spread in a large number of directions. Accordingly, the sharp images of the display are clearly viewable over a wide range of horizontal and vertical viewing angles. The dimensions of the resulting viewing zone depend in part on the types and orientation of the utilized diffuser and film 17 as will be more fully discussed in the below described Examples.

With respect to ambient light, optional diffuser acts to disperse the incoming ambient rays which are thereafter substantially collimated by faceted film 17. The substantial collimation of the ambient light allows it to proceed directly (i.e. not at an angle) into the LC cell. This is believed to reduce the amount of ambient reflection off of the display panel.

In particular, optical film 17 including facets 19 and optional diffuser 21 provide the viewer of the display with very high contrast ratios at extreme viewing angles, low ambient light reflectivity, high resolution, little or no color shifting, and substantially no gray scale inversion. Coupling these improved viewing characteristics with the fact that backlighting assembly 2 is relatively thin in nature, the result is a relatively thin flat panel LCD with improved viewing characteristics as good as those of conventional CRTs and in many instances better. The effective viewing zone or envelope presented by this particular embodiment is substantially uniform over a wide or large range of viewing angles with respect to contrast, color saturation, resolution, ambient reflections, and lack of gray scale inversion and color shifts.

The provision of diffuser 21 allows the viewing envelope or zone of the display to be enlarged in both the horizontal (or "x") and vertical (or "y") viewing angle directions. Thus, when such a viewing envelope is desired, diffuser 21 is preferably provided. However, film 17 alone gives the display good viewing characteristics in the viewing directions substantially perpendicular to the lengthwise facet direction, such that when only such viewing characteristics are desired, diffuser 21 need not be provided exterior film 17.

While the aforesaid typical operation of the first embodiment of this invention describes a normally white twisted nematic a-Si TFT driven AMLCD, the provision of diffuser 21 and optical film 17 is also applicable to super-twisted LCDs, passive matrix LCDs, normally black AMLCDs, diode driven LCDs, etc. The use of a normally white AMLCD to describe the first embodiment of this invention is purely illustrative in nature and in no way limits the provision of diffuser 21 and optical film 17 to normally white AMLCDs.

FIG. 1(b) is a side elevational cross sectional view of an LCD assembly according to a second embodiment of this invention. This second embodiment differs from the first embodiment (FIG. 1(a)) in that facets 19 and the diffuser are integrally formed as one piece 40. Facets 19 of piece 40 face LC layer 9 and act, as in the first embodiment, to refract the light rays emitted from the display panel and substantially collimate the incoming ambient light. Diffusing or roughened surface 33 of diffuser/refractor 40 is integrally formed with facets 19 via piece 40.

FIG. 2 is a side elevational cross sectional view of a liquid crystal display assembly according to a third embodiment of this invention. This third embodiment is identical to the aforesaid first embodiment, i.e. FIG. 1(a), except for the orientation of optical faceted film 17 and the type of conventional anti-reflective AR film or coating 35 on diffuser 21.

The provision of anti-reflective film or coating 35 on the exterior roughened surface of diffuser 21 decreases the ambient light reflection of the display panel, preferably with respect to both specular and diffused reflections. AR coating 35 may have a topography similar to that of light scattering or roughened outer surface 33 of diffuser 21 so as to not hinder the light spreading characteristics of diffuser 21, or alternatively, may be provided on a separate glass substrate exterior diffuser 21 as shown in FIG. 1(a). As will be understood by those of skill in the art, such AR coatings may be provided in any of the different embodiments of this invention.

Optionally, a conventional AR coated tri-peaked enhancement filter typically used with CRTs, may be provided exterior the front surface of the panel to even further reduce reflection. This filter may abut the exterior surface of the diffuser.

In this third embodiment (i.e. FIG. 2), optical BEF 17 is inverted with respect to its orientation in the first embodiment of this invention, so that optical facets 19 of film 17 face diffuser 21 as well as the viewer. By orienting facets 19 in such a manner, the collimated light emitted from the display panel via front polarizer 15 is at least partially or fully re-collimated by facets 19 before reaching diffuser 21. Therefore, the displayed image is substantially collimated in nature when it reaches light scattering surface 33 of diffuser 21.

The viewing characteristics (e.g. reflection, resolution, etc.) of this third embodiment shown in FIG. 2 are not as good as those where facets 19 of film 17 face the liquid crystal layer. Thus, while this third embodiment is believed to be inventive because it does improve certain viewing characteristics, it highlights the truly inventive breakthrough of orienting facets 19 in such a manner that they face liquid crystal layer 9, or in other words, the direction away from the viewer.

Optical film 17 as shown in FIG. 2 is optically adhered or affixed to polarizer 15 and diffuser 21 by way of the aforesaid index matching oil or index matching adhesive in a similar manner as discussed with respect to the first embodiment of this invention. If the oil is used, then film 17 and diffuser 21 must be compression mounted as discussed above.

FIG. 3 is a side elevational cross sectional view of a liquid crystal display assembly according to a fourth embodiment of this invention. This fourth embodiment differs from the FIG. 1(a) first embodiment in that BEF 17 obtained from 3M and diffuser 21 are disposed interior of front polarizer 15. In other words, front linear polarizer 15 and transparent glass substrate 13 sandwich optical film 17 and diffuser 21 therebetween. This provision of film 17 and diffuser 21 interior of polarizer 15 results in acceptable diffused and specular ambient light reflections off of the panel. Optionally, an AR coating may be provided on the exterior surface of polarizer 15.

As shown in FIG. 3, optical refracting/collimating facets 19 of BEF 17 face liquid crystal layer 9 and abut or closely abut the outer or exterior planar surface of transparent glass substrate 13. Furthermore, the light scattering or roughened surface 33 of diffuser 21 still faces the viewer in this embodiment, and therefore abuts front polarizer 15.

Because of the roughness of the microstructure defining surface 33, air gaps are defined between surface 33 and the interior surface of polarizer 15, these gaps preferably not being filled with index matching oil or adhesive. The air gaps created between facets 19 and the exterior surface of substrate 13 may be filled (partially or fully) with either a conventional index matching oil or adhesive, or simply be left alone. Accordingly, the tri-layer structure of BEF 17, diffuser 21, and polarizer 15 may be either compression mounted to the display panel or adhered thereto via the conventional index matching adhesive.

The configuration of this FIG. 3 embodiment, for example, results in an ambient specular 30° reflection of less than about 2.0% and diffused reflection of less than about 1.0% when BEF 90/50 and a holographic 100°×30° diffuser are utilized. Additionally, a conventional AR coating may be disposed on the exterior surface of polarizer 15.

As an alternative structure to the above, front polarizer 15 may be sandwiched between optical faceted film 17 and diffuser 21, with faceted film 17 abutting both polarizer 15 and substrate 13. The facets of film 17 face inward toward LC layer 9 while roughened diffuser surface 33 faces the viewer as in other embodiments of this invention.

This invention will now be described with respect to certain examples as follows:

EXAMPLES

Each of the following Examples utilized a multicolored (red, green, blue triad of subpixels) active matrix a-Si TFT driven twisted nematic liquid crystal display of the normally white type including liquid crystal material Model No. ZLI-4718 commercially available from Merck. The blue subpixel cell gaps "d" for each of the following AMLCDs were about 5.6 μm, while the green subpixel cell gaps "d" were also about 5.6 μm, and the red subpixel cell gaps "d" were about 5.1 μm.

Each of the following exemplary AMLCDs utilized conventional linear input and output polarizers, Model No. G 1220DUN, commercially available from Nitto Denko America, Inc., New Brunswick, N.J. None of the following displays contained a retardation film(s). Because the following exemplary displays were all of the normally white type, the transmission axes of the rear (i.e. input) and front (output) polarizers were substantially perpendicular to one another. The following Examples were carried out at room temperature.

The red, green, and blue color filters of the following exemplary AMLCDs were conventional in nature, as were the substantially transparent pixel electrodes and adjacent polyimide orientation films. The rear or input orientation films were buffed in a direction substantially parallel to the transmission axis of the corresponding input or rear polarizer. Furthermore, the exit or front orientation film of each of the following displays was buffed in a direction substantially parallel to the transmission axis of the display's front or exit polarizer. The rear buffing directions were from bottom right to top left, while the front buffing direction were from top right to bottom left when viewing the display from the top as shown in FIG. 1(a).

The contrast ratio graphs, color plots, and transmission versus voltage graphs in the following Examples were obtained by use of a conventional photometer, Model No. PR650 obtained from PhotoResearch Corporation, Burbank, Calif. The diffused, specular, and all other reflection data in these Examples were measured using a photometer, Model No. 1980A, also obtained from PhotoResearch.

Each of the following exemplary AMLCDs was 4"×4", and utilized as a backlight, a single 300 watt, 82 volt projection halogen lamp 50 obtained from Polaroid. The white light emitted by halogen lamp 50 in each of the following Examples was collimated by way of conventional convex collimating lens 52, having about a 2" diameter.

In each of the below described Examples, the 2" collimating lens 52 was disposed linearly between 300 watt, 82 volt halogen lamp 50 and the display panel, the distance "a" between lens 52 and lamp 50 being about 4" and the distance "b" between the display panel and lens 52 being about 9" in each Example. In other words, halogen lamp 50 in each of the following Examples was positioned about 13" from the rear surface of the display panel (or about 13" from the exterior surface of rear polarizer 3). The backlight including 300 watt, 82 volt halogen lamp 50 and corresponding 2" collimating lens 52 acted to illuminate at least about 90% of the rear display surface with substantially collimated light in each of the following Examples.

Each of the following Examples utilized an AMLCD according to the first or FIG. 1(a) embodiment of this invention (except for AR coating and sheet 35), in that optical faceted film 17 was disposed immediately adjacent and exterior front polarizer 15, with diffuser 21 affixed to the exterior surface of film 17. Facets 19 of film 17 in each of the following Examples faced the liquid crystal material, while the roughened or light scattering surface 33 of diffuser 21 faced the viewer (if the diffuser had such a surface). "Brightness Enhancement Film" or "BEF" obtained from 3M was used as faceted film 17 in each of the below described Examples.

Conventional 1.470 index matched oil was disposed adjacent each side of BEF 17 in each below described Example, such that the index matched oil substantially filled-in the gaps created between facets 19 and polarizer 15, as well as was sandwiched between diffuser 21 and film 17. BEF 17 and diffuser 21 were thus compression mounted onto the display panel in the following Examples by way of conventional transparent tape disposed outside the viewing area.

It is noted that the same LC cell (i.e. LC layer, TFTs, electrodes, polarizers, substrates, orientation films, etc.) was used in each of the following Examples, with only film 17 and diffuser 21 being replaced or adjusted. The utilized display substrates, electrodes, orientation films, TFTs, and address lines are not shown in FIGS. 4, 10, 12, 14, 16, 18, and 20 for purposes of simplicity.

None of the AMLCDs of the below-discussed Examples, except Example 8, utilized any type of AR coating or process adjacent the front of the display.

EXAMPLE 1

Two separate AMLCDs were manufactured and tested in this Example, the first having both faceted BEF 17 and diffuser 21 disposed exterior front polarizer 15 (see FIG. 1(a)) and the second display having only diffuser 21 disposed exterior the front surface of polarizer 15 (i.e. without BEF 17). These two AMLCDs were made and tested so that a comparison could be made between the two, thus leading to a determination of the improvements associated with the addition of faceted film 17.

FIGS. 4-6 and 8 illustrate the first display of this Example in that BEF 17, Model or Product No. 100/31 obtained from 3M, was sandwiched between diffuser 21 and front polarizer 15. Diffuser 21 was Model No. LDS219W obtained from Nitto, New Brunswick, N.J. The same diffuser was used in both the first and second AMLCDs of this Example.

Figure 4:
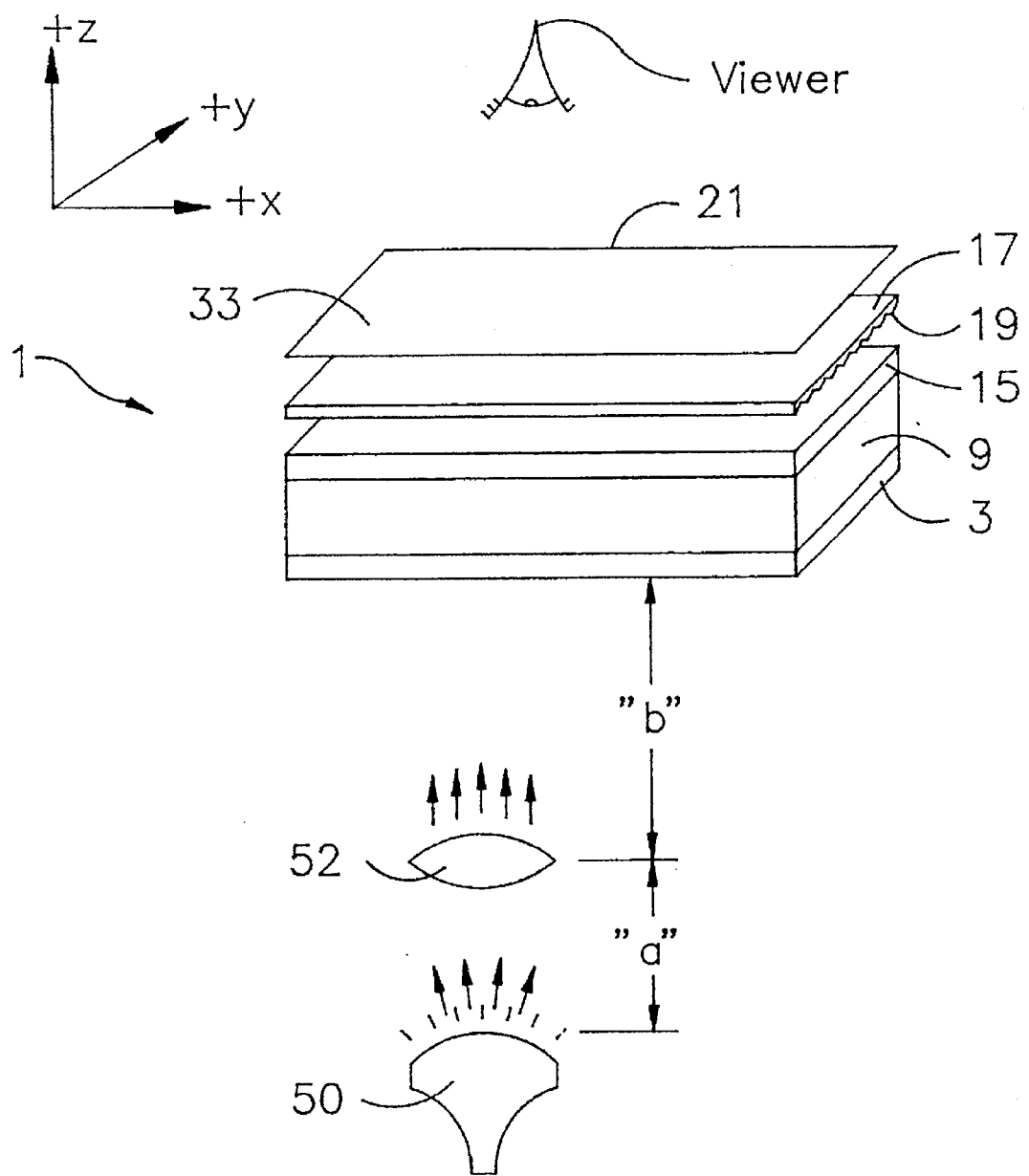
FIG. 4 is an exploded perspective view of the first backlit active matrix liquid crystal display of Example 1 including optical film 17.

As shown in FIG. 4, in the first display of this Example, BEF 17 was arranged such that facets 19 extended horizontally, or from left to right as shown in FIGS. 1(a) and 4. Accordingly, the 112° axis of BEF 17 extended perpendicular to facets 19, while the 80° axis extended parallel to facets 19, or from left to right as shown in FIG. 4. The meanings of the 112° and 80° axes are discussed below in Example 2. Facets 19 faced liquid crystal layer 9 while the flat surface of film 17 abutted diffuser 21.

While FIG. 4 illustrates an exploded perspective view of the first AMLCD of this Example including BEF 17, FIG. 5(a) is a contrast ratio curve plot of this same AMLCD, the graph in FIG. 5(a) illustrating the high contrast ratios obtained over a fairly wide range of viewing angles. This and all other contrast ratio plots herein determine a particular contrast ratio by dividing white intensity by black intensity. For example, if the white or non-driven (0.2 V in this Example) intensity was 100 fL and the black or driven (6.8 V in this Example) intensity was 2 fL at a particular viewing angle, then the resulting contrast ratio would be 50 or 50:1 at that particular viewing angle.

As shown in FIG. 5(a), the first or BEF containing AMLCD of this Example exhibited a contrast ratio (0.2 V intensity divided by 6.8 V intensity) of greater than about 110:1 at normal and maintained at least a contrast ratio of about 70:1 along the 0° vertical viewing axis up to horizontal angles of about −48° and +60°. In a similar manner, the BEF containing AMLCD of this Example had a contrast ratio of at least about 70:1 along the 0° horizontal viewing axis at vertical angles up to about both +30° and −45°. It is noted that this display exhibited contrast ratios of greater than about 60:1 along the 0° vertical viewing axis at angles up to about ±60° horizontal. As will be appreciated by those of skill in the art, these contrast ratios at such high viewing angles are fabulous and represent improvement over the prior art.

FIGS. 5(b)-5(g) illustrate the lack of color shifting associated with and spectrum of light emitted by this exemplary BEF containing AMLCD. Color shifting results when a particular color (or colors) become faint or miscolored at increased viewing angles. For example, the color red may appear pinkish or orange colored as the viewing angle increases. The elimination of such color shifting is clearly a desired result in all modern AMLCDs.

Figure 5B:
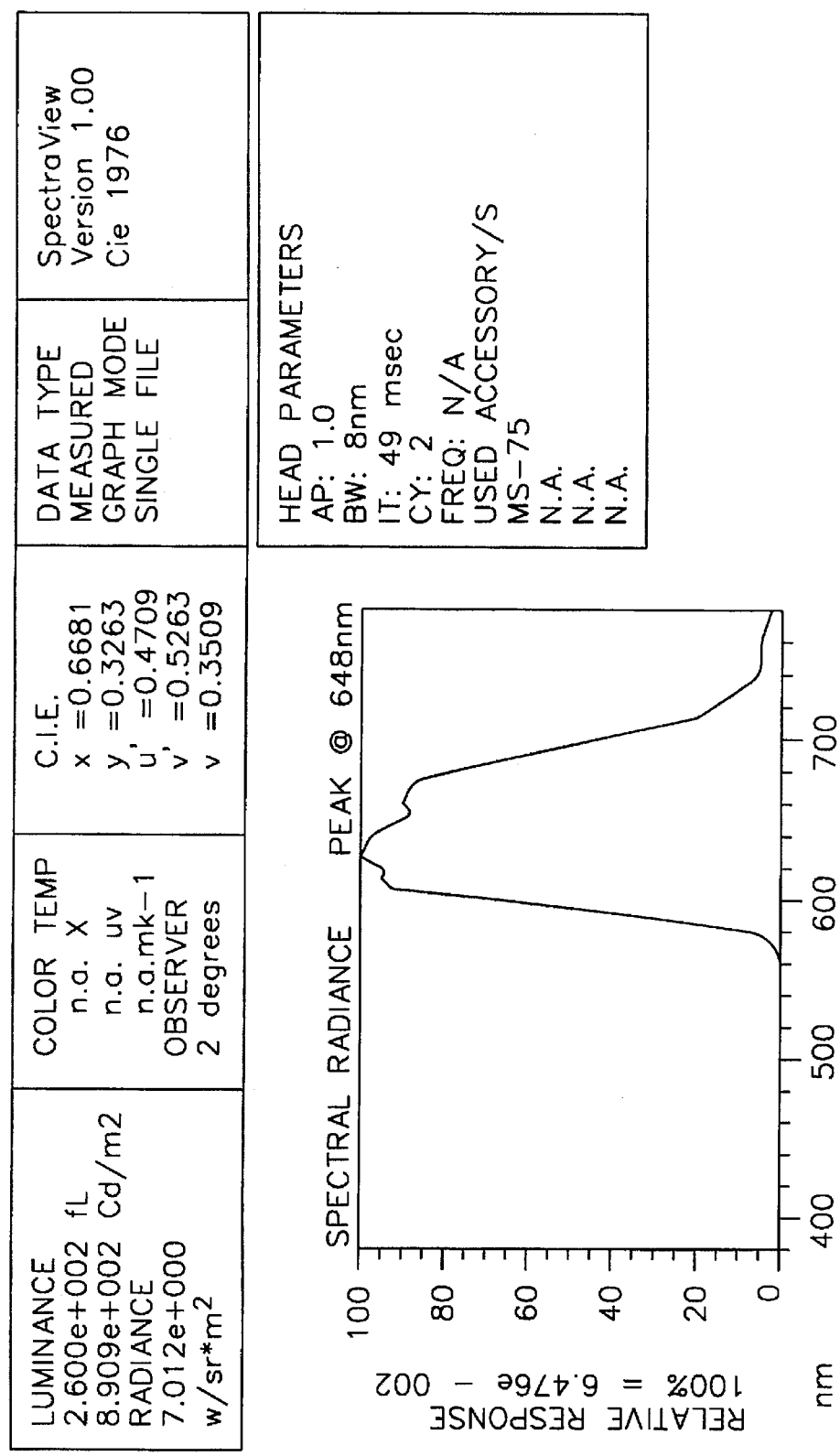
Figure 5C:
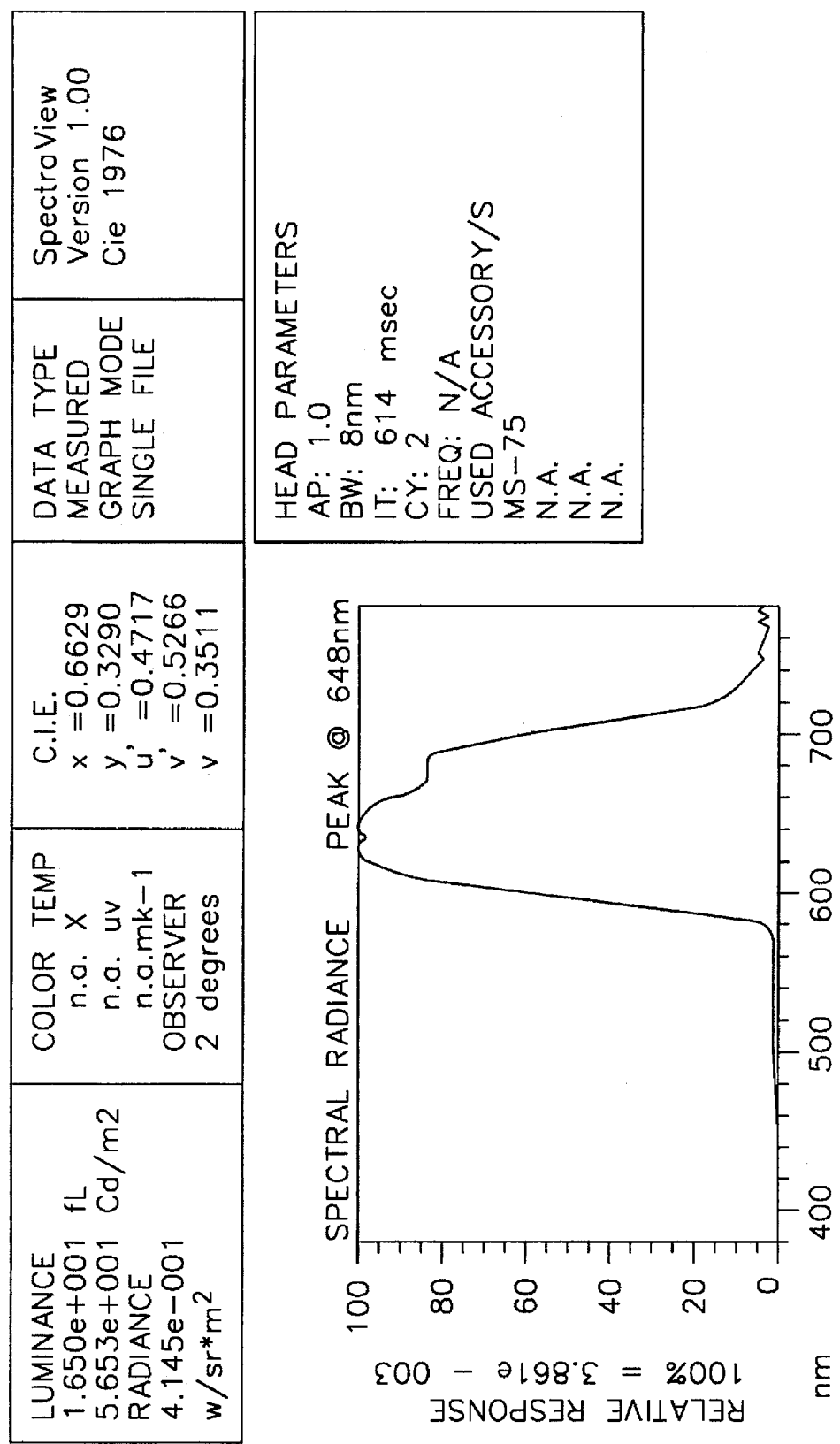

FIG. 5(b) illustrates conventional color measurements obtained for the color red at the normal (or 0° vertical, 0° horizontal) viewing angle, while FIG. 5(c) shows the data obtained for the same color red along the 0° vertical viewing axes at the positive 60° horizontal viewing angle. The luminance, radiance, color, temperature, spectrometer, etc. are listed in the FIG. 5(b) and 5(c) tables as is conventional in the art.

Perhaps the most important measured parameters shown in FIGS. 5(b) and 5(c) are "u'"and "v'". These color parameters are conventional color measurements based on the conventional chromaticity chart which is well-known to those of skill in the art. The parameter u' is a horizontal value on the chromaticity chart and indicates a particular color location, while the value v' is a corresponding vertical color value on the chromaticity chart. By matching (i.e. where they intersect) u' and v' on the chromaticity chart, one may determine the exact color of, for example, red being displayed, the chart illustrating how saturated the color actually is.

While FIG. 5(b) shows the results at the normal (0° vertical, 0° horizontal) viewing angle for the color red, FIG. 5(c) illustrates the same data taken for the 0° vertical, 60° horizontal viewing angle. As can be seen conventionally by the difference in the u' and v' parameters in FIGS. 5(b) and 5(c), there is relatively little color shifting occurring as the viewing angle increases from normal to that of 0° vertical, 60° horizontal. As will be appreciated by those of skill in the art, the maintaining of little or no color shifting in a display as viewing angles increase is a highly desired result in the industry. This allows viewers at both normal and, for example, 60° to see substantially the same colors at particular points on the display panel instead of, for example, one seeing red and the other seeing pink or orange. Thus, this display including BEF 17 and diffuser 21 maintained the uniformity of color over an extremely wide range of viewing angles.

The spectral radiance graphs (i.e. response versus nm or λ) of FIGS. 5(b) and 5(c) illustrate the spectrum of light seen by the viewer at the normal viewing angle in FIG. 5(b) and the 0° vertical, 60° horizontal viewing angle in FIG. 5(c). As shown, there is relatively little difference between the spectrum seen by the viewer in these two cases with respect to the first display of this Example. In other words, the spectrum of light seen by a viewer over a wide range of viewing angles does not substantially change for this AMLCD. The horizontal axis of the spectral radiance graph defines, of course, the visible light spectrum in nanometers or wavelength while the vertical axis is conventional in nature and defines the amount of light being transmitted at each particular wavelength (e.g. red, green, blue, etc.).

Figure 5D:
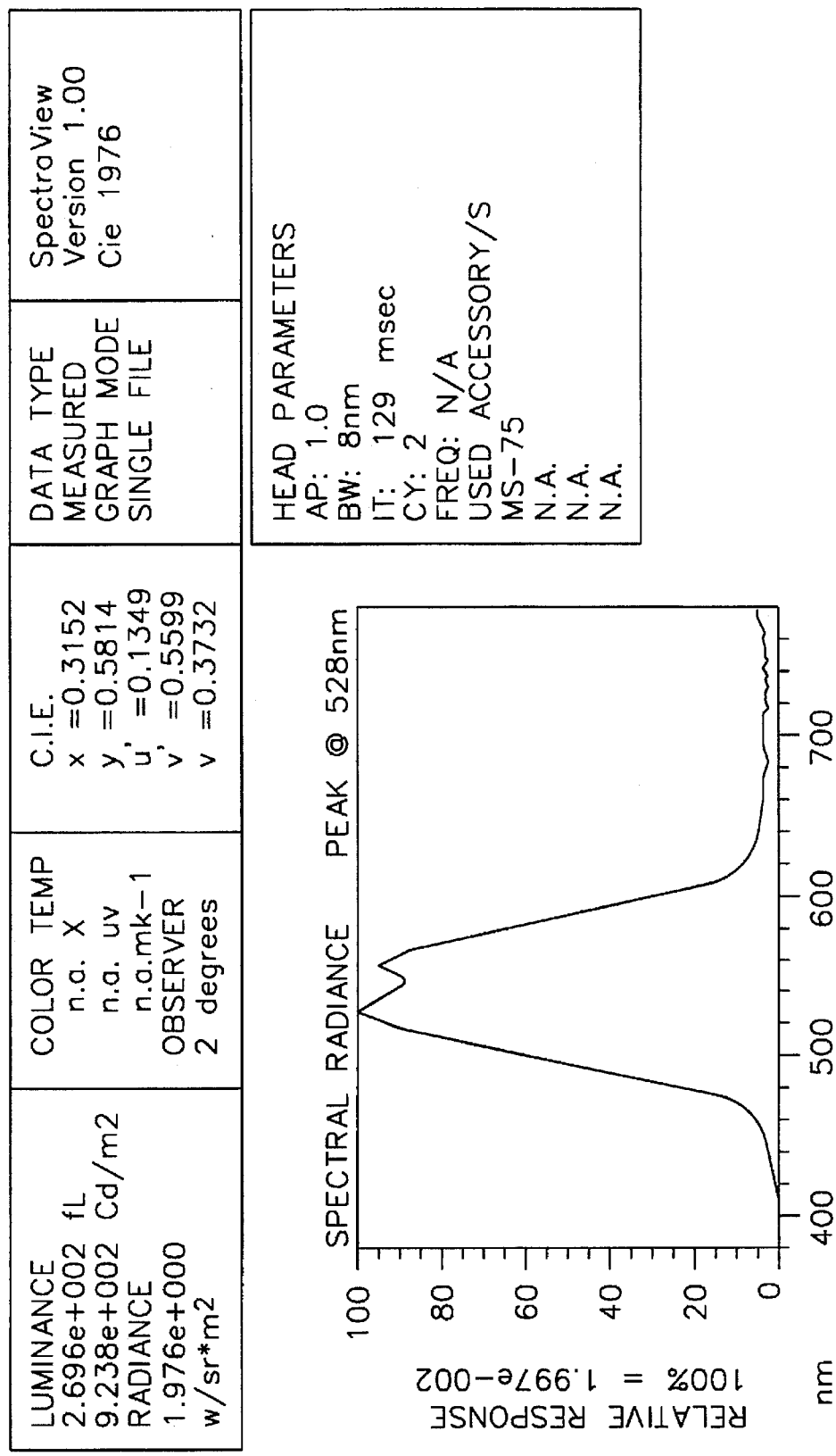
Figure 5E:
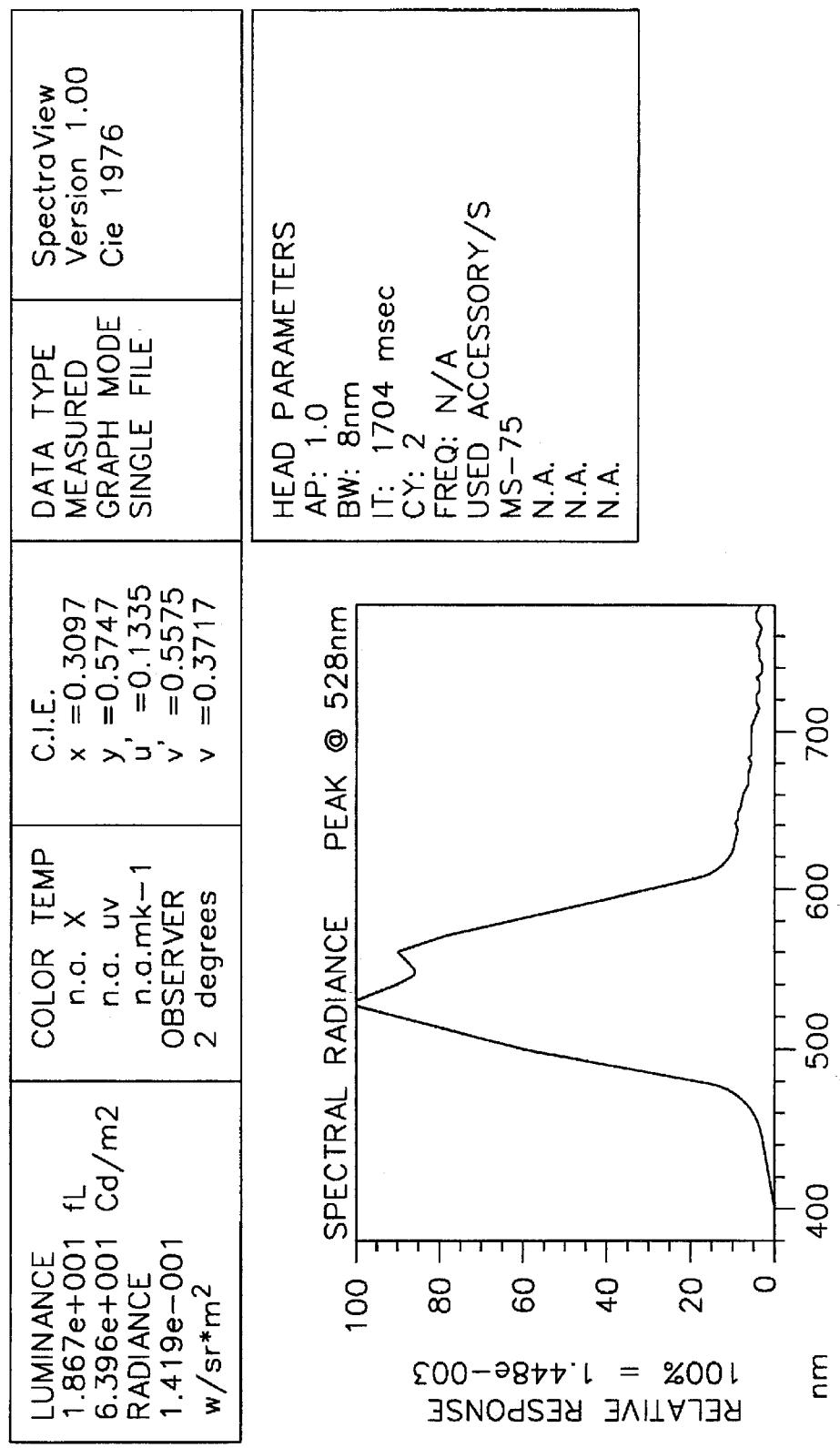
Figure 5F:
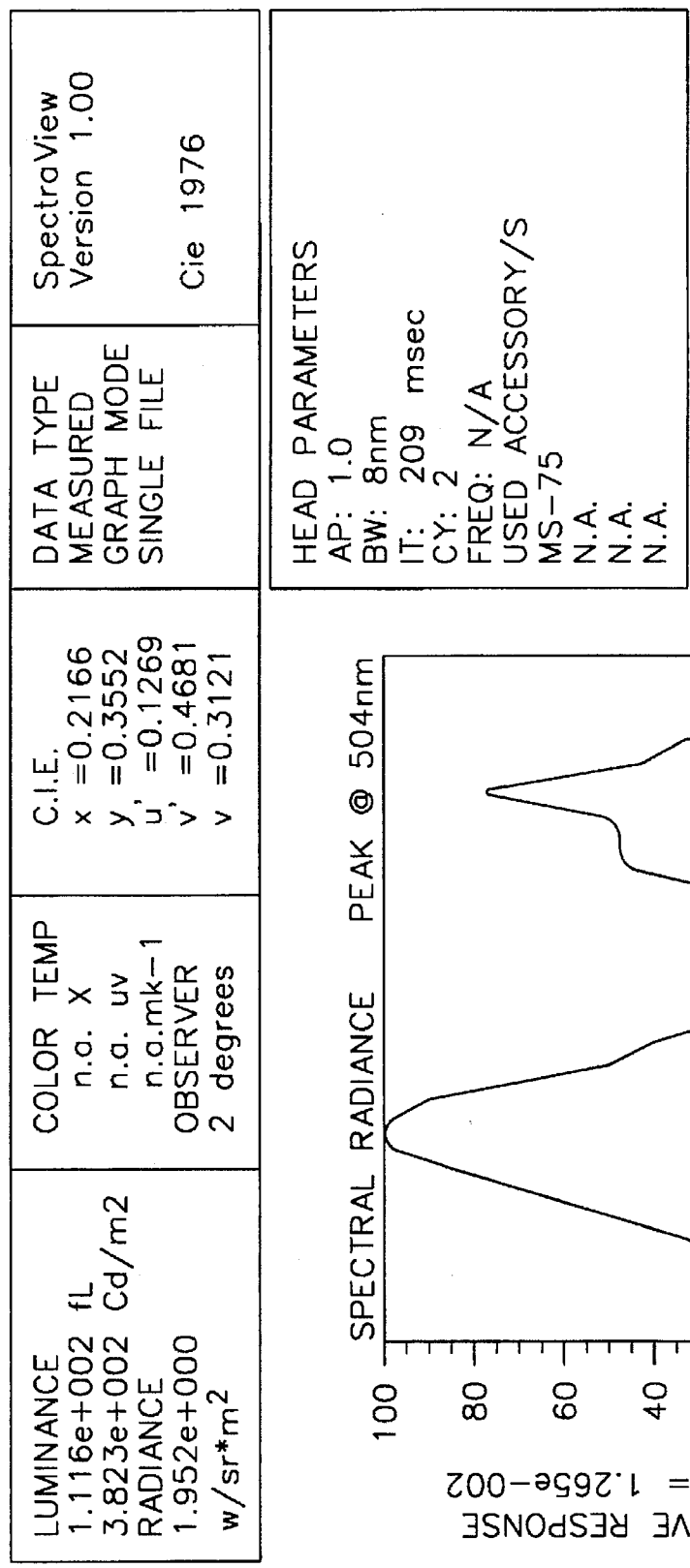
Figure 5G:
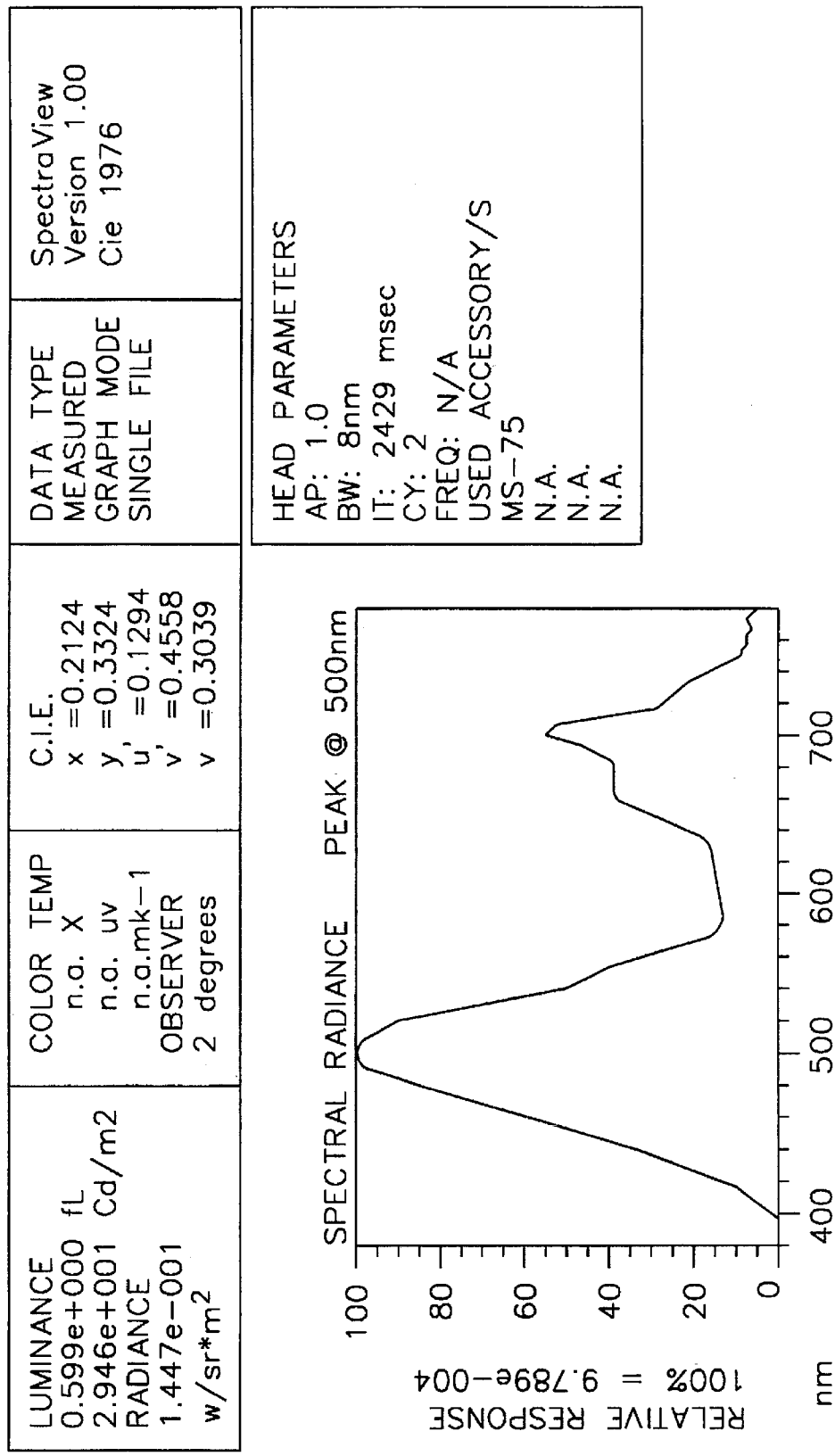

While FIGS. 5(b) and 5(c) illustrate the color data for the color red with respect to the first AMLCD of this Example, FIG. 5(d) and 5(e) illustrate similar results (i.e. very little color shifting over a wide range of horizontal viewing angles) for the color green, and FIGS. 5(f) and 5(g) show the results for the color blue. As can be seen in FIGS. 5(d)-5(g), there was relatively little color shifting in the first display (or BEF containing display) of this Example as the viewing angle increased from 0° horizontal, 0° vertical, to 0° vertical, 60° horizontal, FIGS. 5(d) and 5(f) illustrating the normal viewing angle results and FIGS. 5(e) and 5(g) showing the 0° vertical, 60° horizontal green and blue color data obtained, respectively.

If the display shown in FIG. 4 were to be placed on a vertical wall with diffuser 21 closest to the viewer and facets 19 parallel to the ground, the photometer (i.e. PR650) in this Example regarding FIGS. 5(b)-5(g), was moved from the normal viewing angle to the right until it reached an angle of 60° relative to normal. In such a manner, the normal and 60° horizontal viewing angles were examined as to color shifting.

FIG. 6 illustrates an intensity (fL) versus driving voltage plot of the first or BEF containing AMLCD of this Example. The vertical axis of the plot illustrates the intensity of light received through the panel and seen by the viewer, while the horizontal axis indicates the particular driving voltage (i.e. volts) used to transmit that intensity. For example, when 1.0 volts was applied to the first AMLCD of this Example, a viewer at 0° horizontal, −10° vertical, would have seen an intensity of about 680 fL transmitted through the display panel. At this same 1.0 volt driving voltage, a viewer at 0° horizontal, 0° vertical (i.e. normal) would have seen an intensity of about 650 fL, while a viewer at 0° horizontal, –30° vertical, would have seen about 205 fL transmitted through the display panel. It is noted, as shown in FIG. 6, that all of the viewing angles plotted in FIG. 6 were along the 0° horizontal viewing axis.

FIG. 8 illustrates a similar plot as shown in FIG. 6 except that the plotted viewing angles are along the 0° vertical viewing axis for the first or BEF containing display of this Example. In other words, horizontal viewing angles of about +60° to –60° are shown, all at 0° vertical.

For example, when 1.0 volts was applied to the first AMLCD of this Example, a viewer at normal would have seen about 650 fL transmitted through the display, while a viewer at 0° vertical, 10° horizontal would have received about 430 fL of light.

As can be seen in FIGS. 6 and 8, because the first AMLCD of this Example was of the normally white or crossed polarizer twisted nematic type, as the driving voltage across the LC material increased from 0 volts to 6 or 7 volts, the intensity of light transmitted through the display decreased accordingly. Because the intensity dropped monotonically (there were no inversion humps) relative to the illustrated increase in driving voltage, no inversion occurred. In other words, there was no inversion at any viewing angle because as the driving voltage increased, the intensity continually decreased and did not increase at any point for any viewing angle. As discussed previously and recognized by those of skill in the art, the elimination of inversion in normally white displays is a substantial achievement in of itself.

Turning now to the second manufactured and tested twisted nematic normally white AMLCD of this first Example, this second or BEF-less display was manufactured and tested for the purpose of comparing it to the first or BEF containing display of this Example. The same LCD cell was used in both the first and second displays of this Example, the only difference being that BEF 17 including its facets 19 was removed in order to manufacture and test the second display. In other words, this second display of this Example included the same liquid crystal cell as the first display, along with diffuser 21 laminated via the index matching oil to the exterior surface of front polarizer 15, with no BEF film 17 therebetween. Diffuser 21 in this second display, was, of course, still Model No. LDS219W obtained from Nitto.

FIGS. 7 and 9 illustrate intensity (fL) versus driving voltage plots of this second or BEF-less display. By comparing the first display plots of FIGS. 6 and 8 with the second display plots of FIGS. 7 and 9, it is seen that the provision of BEF 17 between polarizer 15 and diffuser 21 may allow a higher intensity of light to be transmitted through the display to the viewer at presumably identical driving voltages and viewing angles. For example, while FIGS. 6 and 7 both illustrate the intensity at different driving voltages along the 0° horizontal viewing axis at a plurality of vertical viewing angles, the intensity at 1 volt in FIG. 6 (BEF 100/31 containing AMLCD) was about 680 for the –10° vertical viewing angle. However, as shown in FIG. 7, at the same 1 volt driving voltage and –10° vertical viewing angle, the second or BEF-less display of this Example had an intensity of only about 620 fL. It is believed that during the carrying out of this Example, substantially equal driving voltages were applied to both of the aforesaid displays. Thus, the provision of BEF 17 between diffuser 21 and polarizer 15, apparently allowed about 60 fL more light to pass through the display and be seen by the viewer. The higher intensity output by the first AMLCD of this Example which contained BEF 17 is clearly an advantage as will be understood by those of skill in the liquid crystal display field.

By comparing FIGS. 8 and 9, which show intensity versus driving voltage plots along the 0° vertical viewing axis for different horizontal viewing angles for the first (with BEF 17) and second (without BEF 17) AMLCDs of this Example, respectively, it is also seen that the display including BEF 17 apparently transmitted higher intensity images along the 0° vertical axis at a wide range of horizontal angles. For example, as shown in FIG. 8, the first AMLCD of this Example at a 1 volt driving voltage, output about 430 fL to the viewer at 0° vertical, 10° horizontal, while in contrast to this and shown in FIG. 9, the second AMLCD of this Example at the same 1.0 volt driving voltage, only output about 395 fL to the viewer at this same viewing angle.

Turning now to the ever important issue of ambient light reflection, the second or BEF-less twisted nematic AMLCD of this first Example was tested with respect to both specular and diffused ambient light reflections in its driven or darkened state. The results of these reflection tests are shown in CHART 1 set forth below, with the terms specular reflection and diffused reflection being well-known throughout the art and their meaning illustrated and described with respect to FIGS. 23 and 24.

The below listed Diffused Reflection at Normal data in CHART 1 was measured using a conventional integrating sphere light source in the conventional manner.

CHART 1
REFLECTION DATA OF SECOND
DISPLAY OF EXAMPLE 1 (NO BEF FILM)

| Angle (hor.) | Display | Source | % Reflection |
|---|---|---|---|
| SPECULAR REFLECTION | | | |
| 15° | 0.56 fL | 500 fL | 0.11% |
| 30° | 0.57 fL | 500 fL | 0.11% |
| 60° | 1.77 fL | 500 fL | 0.35% |
| 15° | 0.54 fL | 500 fL | 0.11% |
| 30° | 0.56 fL | 500 fL | 0.11% |
| 60° | 1.78 fL | 500 fL | 0.36% |
| DIFFUSED REFLECTION | | | |
| 15° | 607 fL | 9807 fL | 6.19% |
| 30° | 507 fL | 9369 fL | 5.41% |
| 60° | 424 fL | 7384 fL | 5.74% |
| 15° | 612 fL | 9801 fL | 6.24% |
| 30° | 522 fL | 9340 fL | 5.59% |
| 60° | 440 fL | 7472 fL | 5.89% |

| DIFFUSED REFLECTION AT NORMAL | | | |
|---|---|---|---|
| Angle (0°, 0°) | Display | Sphere Source | % Reflection |
| N | 1735 fL | 34300 fL | 5.06% |
| N | 1733 fL | 33500 fL | 5.17% |

This chart lists two separate tests done for each listed horizontal viewing angle along the 0° vertical axis for both specular and diffused reflection as well as two tests at normal using a conventional integrating sphere light source to determine the diffused reflection of the display at normal.

Looking at, for example, the first 15° specular reflection test, the ambient or environmental light source directed 500 fL of light toward the display panel. The conventional photometer (i.e. 1980A) was disposed along the 0° vertical viewing axis at an angle of about 15° horizontal and picked up about 0.56 fL worth of light reflecting off of the display panel from the original 500 fL generated by the source, the source positioned about 0° vertical, −15° horizontal. Accordingly, by dividing 0.56 fL by 500 fL, the result is a 0.11% specular reflection off of the second or BEF-less AMLCD of this Example.

Similarly, looking at the first 15° diffused reflection test, the source at the normal viewing angle emitted 9807 fL while the photometer positioned 15° horizontal picked up 607 fL off of the display panel. Accordingly, by dividing 607 fL by 9807 fL, the result was a 6.19% diffused ambient light reflection off of the front or viewer side surface of the display panel at about fifteen degrees.

The aforesaid listed reflection characteristics for the BEF-less or second display of Example 1, especially the "diffused" and "diffused reflections at normal" are less than desirable and could be improved upon. As can be seen from CHART 1, a significant drawback of the second AMLCD of this Example is its relatively high amount of ambient light reflection. For example, this display has, at 0° vertical, 15° horizontal, a diffused reflection of about 6.24%, while also having diffused reflections of about 5.5% and 5.8% at viewing angles of 30° and 60° horizontal respectively. Furthermore, the diffused reflections at normal using the integrating spherical light source were greater than about 5%.

These high ambient light reflections shown in CHART 1 lead to reduced viewing capabilities in atmospheres having moderate or high ambient lighting conditions. In other words, this BEF-less display would be hard to view in conditions such as sunlight, high ambient light office environments, etc. Unfortunately, no reflection data has currently been recorded with respect to the first or BEF containing AMLCD of this Example. Therefore, the reflection data of the second or BEF-less AMLCD of this Example listed in CHART 1 will be compared below to a similar chart listing reflection data of a BEF containing AMLCD.

The resolutions of the first and second AMLCDs of this Example were tested visually, the result being that the first or BEF containing display had much better uniformity of resolution as viewing angle increased. The resolution of the first display was about twice as good as that of the second or BEF-less display at about 0° vertical, ±60° horizontal, the resolution of the first display also being substantially better than that of the second display at about ±30° and ±45° horizontal viewing angles. Thus, it is believed that the presence of BEF 17 maintains the resolution of the display over a wide range of viewing angles.

Summing up Example 1, the first display including BEF 100/31 and the adjacent diffuser provided a very uniform viewing zone throughout a wide range of viewing angles with respect to contrast, resolution, inversion (i.e. lack of), ambient light reflection, and color saturation (i.e. lack of color shifts), with the ambient reflection of the first display visually seen to be less than that of the second or BEF-less display.

EXAMPLE 2

FIGS. 10–11 illustrate the structural design and contrast ratio plot of this Example, respectively. A single AMLCD was manufactured and tested in this Example. BEF 17 utilized in this display was Product or Model No. 100/31 and obtained from 3M, the 112° axis being in the vertical direction or as shown in FIG. 10, from front to rear. The elongated length of facets 19 was horizontal in this Example or from left to right as shown in FIG. 10. BEF 100/31 has a prism pitch of 31 μm, a prism angle of 100°, is made of polycarbonate, has an index of refraction of 1.586, and is 0.009 inches thick. Additionally, the nominal total viewing angle of BEF 100/31 if the light first hits its flat surface in its use suggested by 3M and then facets 19 is 112° horizontal and 80° vertical, the 112° horizontal axis believed to extend across or perpendicular to the length of facets 19. The use of BEF 17 in this and the other Examples herein was contrary to the use suggested by 3M in that facets 19 face the backlight source and first receive the incoming light.

Because the index of refraction of BEF 17 and its adjacent index matching oil disposed on both sides thereof were different (1.586 versus 1.470), facets 19 were believed to refract the light coming from the display panel via polarizer 15.

Diffuser 21 was a holographic diffuser, 100°/30°, obtained from POC, Physical Optics Corporation, Torrance, Calif. The roughened or light scattering surface of holographic diffuser 21 in this Example faced the viewer, or away from liquid crystal material 9. Furthermore, the 100° or ±50° axis of diffuser 21 was horizontally aligned, with the 30° axis (or ±15° axis) being vertically aligned. Facets 19 of 3M's BEF 17 were horizontally aligned and faced the exterior surface of front polarizer 15. Therefore, the ±50° axis, or 100° axis, of diffuser 21 was parallel to or aligned with the length of facets 19 of film 17.

Holographic diffuser 21 was oriented in this display in a manner opposite to that suggested by its supplier, POC. POC suggests orienting holographic diffuser 21 so that incoming light first hits roughened surface 33. Here we orient diffuser 21 such that the incoming light proceeds through the body of the diffuser before reaching surface 33.

FIG. 11 illustrates the contrast ratio plot of the normally white twisted nematic AMLCD of Example 2. As can be seen, this display exhibited a contrast ratio of greater than about 100:1 (or 100) at the normal viewing angle, and maintained a contrast ratio of greater than about 70:1 along the 0° vertical viewing axis at horizontal viewing angles of up to about ±60°, the term "±" meaning, of course, herein, both positive and negative. Surprisingly, this display had a contrast ratio of about 90:1 at horizontal viewing angles of up to about 0° vertical, −22° horizontal and 0° vertical, 60° horizontal.

The contrast ratio plot of this Example was an improvement over that of the BEF containing AMLCD of the Example 1, the contrast ratio plot of the first Example being shown in FIG. 5(a). Accordingly, it is believed that the holographic diffuser utilized in this Example along with BEF film 17 provides a normally white AMLCD with extremely good contrast ratios over a wide range of viewing angles, especially in the horizontal direction.

While this AMLCD exhibited very good contrast ratios along the 0° vertical axis in the horizontal direction, it also exhibited extremely good contrast ratios along the 0° horizontal axis. For example, the display had contrast ratios of at least about 30:1 along the 0° horizontal viewing axis at vertical angles up to about −40° and +35°.

The specular, diffused, and diffused normal ambient light reflection characteristics of this a-Si TFT driven normally white AMLCD were tested as the display was driven dark, the results listed in CHART 2 as follows:

CHART 2
REFLECTION DATA OF EXAMPLE 2

| Angle (hor.) | Display | Source | % Reflection |
|---|---|---|---|
| SPECULAR REFLECTION | | | |
| 15° | 0.49 fL | 506 fL | 0.09% |
| 30° | 0.56 fL | 501 fL | 0.11% |
| 60° | 0.45 fL | 500 fL | 0.09% |
| 15° | 0.47 fL | 503 fL | 0.09% |
| 30° | 0.54 fL | 501 fL | 0.11% |
| 60° | 0.43 fL | 500 fL | 0.09% |
| DIFFUSED REFLECTION | | | |
| 15° | 302 fL | 9719 fL | 3.10% |
| 30° | 285 fL | 9544 fL | 2.98% |
| 60° | 312 fL | 7151 fL | 4.36% |
| 15° | 255 fL | 8756 fL | 2.91% |
| 30° | 278 fL | 9719 fL | 2.86% |
| 60° | 291 fL | 6567 fL | 4.43% |

DIFFUSED REFLECTION AT NORMAL

| Angle (0°, 0°) | Display | Sphere Source | % Reflection |
|---|---|---|---|
| N | 801 fL | 34200 fL | 2.34% |
| N | 880 fL | 34400 fL | 2.56% |

This display, as seen above, had extremely good reflection characteristics in ambient light environments. For example, the 30° diffused ambient light reflection of this display is measured to be less than about 3%, while the 15° ambient light diffused reflection was measured to be about 2.9%–3.1%. Furthermore, the specular reflection at horizontal viewing angles of 15°–60° along the 0° vertical viewing axis was measured to be continuously less than or equal to about 0.11%. As will be recognized of those or ordinary skill in the art, the amount of ambient light reflection off of the panel of this display was very low and provided for good display viewing in ambient lightened environments such as sunlight.

If the reflection data of CHART 2 this Example is compared to CHART 1 of the second or BEF-less AMLCD of Example 1, it can be seen that the addition of BEF film 17 apparently significantly reduces ambient light reflections with respect to both specular, diffused, and diffused normal (0° vertical, 0° horizontal) reflections. This is believed to be due to the fact that BEF 17 acts to substantially collimate the ambient light directed toward the panel. The diffused ambient light reflections of this display were about half of those listed in CHART 1, CHART 1 corresponding to an AMLCD without BEF 17. Accordingly, it seems evident that the addition of BEF 17 was important with respect to reducing ambient light reflections emitted from the display panel.

EXAMPLE 3

FIG. 12 is an exploded perspective view of the normally white twisted nematic a-Si TFT driven AMLCD of this Example including BEF 17 and diffuser 21. The BEF of this Example was Product or Model No. 90/50 obtained from 3M, with facets 19 of film 17 being aligned in the vertical or front to rear direction as shown in FIG. 12, facets 19, of course, facing the exterior surface of polarizer 15. BEF 90/50 has a prism pitch of 50 µm, a prism angle of 90°, an index of refraction of 1.586, is 0.009 inches thick, and is made of polycarbonate. When used so that light hits the flat side of BEF 90/50 before hitting facets 19 as suggested by 3M, 90/50 BEF has a horizontal nominal total viewing angle of 104° and a vertical nominal total viewing angle of 70°. It is believed that the 104° or ±52° axis is perpendicular to the length of facets 19. It is noted that this display as do the other Examples herein orients BEF 17 in a manner opposite to that suggested by the manufacturer, 3M.

Diffuser 21 was a holographic diffuser, valued 100°/30° (or 100°×30°) and was obtained from POC, Physical Optics Corporation, Torrance, Calif. The 100° or ±50° axis of diffuser 21 in this Example was aligned vertically or parallel to the length of facets 19 of film 17. Accordingly, the ±15° or 30° axis of diffuser 21 was aligned horizontally or from left to right as viewed in FIG. 12. Roughened surface 33 of holographic diffuser 21 faced the viewer.

While the display of Example 2 oriented facets 19 of film 17 and the major or greater diffusion axis horizontally, or from left to right as viewed in FIG. 10, the AMLCD of this Example oriented facets 19 vertically from front to rear substantially parallel to the major diffusion axis (±50°). In other words, there are only two differences between the AMLCDs of Example 2 and this Example, the first being that this Example utilized 90/50 BEF film 17 (instead of 100/31), and the second difference being that both film 17 and holographic diffuser 21 were rotated 90° in this Example relative to their respective orientations in Example 2.

The result of the 90° rotation of film 17 and diffuser 21 in this Example relative to the display of Example 2 is evident in FIG. 13, which is a contrast ratio plot of the AMLCD of this Example. As can be seen, the result of rotating BEF 17 and adjacent diffuser 21 90° so that the major diffuser axis (±50°) and the facets of the BEF 17 were oriented vertically, or from front to rear, is that the viewing zone, instead of being elongated in the horizontal direction as in Example 2, is elongated vertically along the 0° horizontal viewing axis as shown in FIG. 13.

As shown, the display of this Example had at least about an 80:1 contrast ratio at vertical viewing angles up to about 40° and −37° along the 0° horizontal viewing axis. Furthermore, this display had a contrast ratio (or contrast) of at least about 75:1 (or 75) along the 0° horizontal viewing axis at vertical viewing angles up to about ±40°. This display also exhibited good contrast along the 0° vertical viewing axis in that it maintained a contrast ratio of at least about 30:1 or 30 at horizontal viewing angles up to about −58° and +60° from normal.

EXAMPLE 4

FIGS. 14–15 illustrate the exploded perspective view and corresponding contrast ratio curve plot of the normally white twisted nematic a-Si TFT driven AMLCD manufactured and tested in this Example. Film 17 was BEF 90/50 obtained from 3M, while facets 19 of film 17 were arranged horizontally or from left to right as shown in FIG. 14. Because facets 19 were arranged from left to right, the 70° or ±35° axis of film 17 was also arranged horizontally from left to right, while the 104° axis was arranged vertically or from front to rear as shown in FIG. 14.

Diffuser 21 of this Example was a holographic diffuser obtained from POC Corporation and had a diffusion value of 100°/30° (or 100°×30°). The 100° or ±50° axis of diffuser 21 was aligned substantially parallel to the length of facets 19 of film 17, or from left to right as shown in FIG. 14. Therefore, the ±15° diffuser axis was arranged vertically and substantially perpendicular to the ±50° diffusion axis.

As in all of the Examples described herein, the light scattering or roughened surface of holographic diffuser 21 of this Example faced the viewer or the direction away from liquid crystal material 9, and facets 19 of film 17 faced liquid crystal material 9 and substantially abutted the exterior surface of polarizer 15 with the previously discussed index matching oil disposed between film 17 and polarizer 15. The same oil was, of course, disposed between the flat surface of film 17 and the corresponding adjacent flat surface of diffuser 21.

As in all of the Examples herein, halogen lamp 50 and corresponding collimating lens 52 were used to illuminate or backlight the display panel of this Example. The distance "a" between lamp 50 and lens 52 was about 4", while the distance "b" between lens 52 and display panel 1 was about 9", resulting in a gap of about 13" between lamp 50 and display panel 1.

The only difference between this Example and Example 3 was that in this Example both BEF 17 and holographic diffuser 21 were rotated 90° with respect to their orientations in Example 3. The resulting contrast ratio plot for this orientation is shown in FIG. 15.

As can be seen, this AMLCD had extremely good contrast ratio contours, even at very large horizontal and vertical viewing angles. For example, this display had a contrast ratio of greater than about 90:1 or 90 along the 0° vertical viewing axis at horizontal viewing angles up to at least about ±60°. Furthermore, this AMLCD exhibited contrast of about 50:1 or greater along the 0° horizontal viewing axis at vertical viewing angles of up to about −40° and +25°, while having a contrast of greater than about 120:1 at normal.

As listed in FIG. 15 and the other Examples herein, the contrast ratio plot of this Example was determined by using a driving or on-state voltage of 7.0 volts applied to the a-Si TFT driven AMLCD and an off-state or below threshold voltage of 0.2 volts applied to the display.

Furthermore, the resolution of this AMLCD was tested visually and compared to that of both Example 1 displays, the result being that while this display had incredibly better resolution at increased viewing angles than did the second or BEF-less Example 1 display, this AMLCD also had better resolution at increased horizontal viewing angles than did the first Example 1 display.

EXAMPLE 5

FIGS. 16–17 show the exploded perspective view and corresponding contrast ratio curve plot of the normally white twisted nematic a-Si TFT driven AMLCD of this Example. The AMLCD of this Example utilized holographic diffuser 21 with a value of 100°/30° or 100°×30° commercially obtained from POC, Physical Optics Corporation, the roughened or light scattering surface of diffuser 21 facing the viewer in a direction away from the display panel. The display of this Example also utilized 90/50 BEF obtained from 3M, with facets 19 facing front polarizer 15 and liquid crystal material 9.

The major or larger light scattering axis, i.e., ±50°, of holographic diffuser 21 in this Example was oriented vertically, or from front to rear as shown in FIG. 16, with the minor ±15° or 30° axis oriented horizontally. Facets 19 of BEF 17 in this AMLCD were aligned horizontally with the 70° axis of film 17 also aligned horizontally and the 104° axis aligned vertically and substantially parallel to the diffuser ±50° axis.

In other words, the only difference between this Example and Example 4 is that in this Example, diffuser 21 was rotated 90° relative to its orientation in Example 4. The resulting contrast ratio plot of the display of this Example is shown in FIG. 17. As can be expected, because the ±50° diffuser axis was aligned vertically in this Example, the effective viewing zone of this display was elongated vertically along the 0° horizontal viewing axis as shown by FIG. 17.

The display exhibited contrast ratios of at least about 80:1 along the 0° horizontal viewing axis at vertical angles up to about −37° and +50°. These high contrast ratios at such high vertical viewing angles are excellent and will be greatly appreciated by those of skill in the art. This display also maintained at least about a 30:1 contrast along the 0° vertical viewing axis at horizontal angles up to about ±49°.

It appears from comparing the contrast plot of this Example (i.e. FIG. 17) with the contrast plot of Example 4 (i.e. FIG. 15), that the orientation of the major or largest diffuser axis, i.e. the ±50° axis, dictates the orientation or shape of the resulting viewing zone or envelope. In this Example, because the major diffuser axis was oriented vertically, or from front to rear, the viewing zone's high contrast areas were elongated in the vertical direction as shown in FIG. 17, while in Example 4 when the major ±50° diffuser axis was oriented horizontally, or from left to right as shown in FIG. 14, the resulting viewing zone's high contrast areas were elongated horizontally instead of vertically. The bottom line is that the orientation of diffuser 21 appears to dictate the direction in which the displays contrast ratio plots are elongated.

EXAMPLE 6

FIGS. 18 and 19 respectively illustrate the exploded perspective view and corresponding contrast ratio plot for the normally white AMLCD of this Example. It is to be remembered that the same display cell (LC layer, substrates, opposing polarizers, TFTs, electrodes, orientation films, address lines, etc.) was used in each of the Examples described herein with only film 17 and diffuser 21 being replaced or adjusted.

The AMLCD of this Example utilized a 100°/30° holographic diffuser 21 obtained from POC, Physical Optics Corporation, and 90/50 BEF 17 obtained from 3M. The major or 100° (±50°) axis of diffuser 21 was oriented horizontally or from left to right as shown in FIG. 18, while the lengthwise direction of facets 19 of BEF 17 was oriented substantially perpendicular to the major axis of diffuser 21, or in a vertical direction from front to rear as shown in FIG. 18.

Because the major diffuser axis was oriented horizontally in this Example, the resulting display's contrast curve plot shown in FIG. 19 was elongated horizontally in nature along the 0° vertical viewing axis. As can be seen, this display exhibited contrast ratios of greater than about 90:1 along the 0° vertical viewing axis at horizontal viewing angles up to about ±60°. Furthermore, this display exhibited contrast ratios of about 30:1 or greater along the 0° horizontal viewing axis at vertical angles up to about ±40°. Coupling this display's excellent contrast plot shown in FIG. 19 with its reduced diffused and specular reflectance characteristics discussed above results in the display being excellent for usage in a wide variety of environments and situations.

EXAMPLE 7

FIGS. 20–21 illustrate the exploded perspective view and corresponding contrast ratio plot of the a-Si TFT driven normally white twisted nematic AMLCD of this Example. The display of this Example had 90/50 BEF 17, with the 70° axis oriented vertically or from front to rear as shown in FIG. 20. Facets 19 of film 17 were aligned vertically as shown in FIG. 12.

This display also included a 107°/32° holographic diffuser, Serial No. 105-41B, obtained from Kaiser Optical Systems, Ann Arbor, Mich., with the 107° or ±53.5° diffuser axis being oriented horizontally or from left to right as shown in FIG. 20. In other words, the diffuser's ±16° axis was aligned substantially parallel to facets 19 of BEF 17, with facets 19 facing the liquid crystal material. Holographic diffuser 21 of this Example was believed to be of the gelatin filter type encapsulated by two pieces of glass. Furthermore, a conventional AR coating was provided on the exterior surface of this diffuser to even further reduce the ambient light reflection of this display, although it was not specifically measured.

FIG. 21 illustrates the resulting contrast ratio curve plot for the display of this Example which utilized the gelatin diffuser obtained from Kaiser Optical Systems along with BEF 17. As can be seen in FIG. 21, this display had a contrast ratio of greater than about 130:1 at normal, and a contrast ratio of greater than about 100:1 along the 0° vertical viewing axis from about −60° to +60° horizontal. Accordingly, this display exhibited excellent contrast ratios horizontally at extremely wide viewing angles, as will be greatly appreciated by those of skill in the art. However, the contrast ratios along the 0° horizontal axis were somewhat limited in this display as shown in FIG. 21 with respect to those of the previous Examples. Nevertheless, this display exhibited excellent results and coupled with its reduced diffused and specular reflections, would be an excellent AMLCD available for use in a wide variety of environments.

EXAMPLE 8

FIG. 3 shows the cross sectional view of the AMLCD of this Example in that BEF 90/50 17 from 3M and diffuser 21 were disposed interior front polarizer 15, with facets 19 of BEF 17 facing LC layer 9 and roughened surface 33 of holographic diffuser 21 facing the viewer and abutting the interior surface of polarizer 15. Diffuser 21 was the same 100°/30° holographic from POC as previously mentioned. Conventional HEA anti-reflective coating obtained from OCLI, Santa Rosa, Calif., was disposed on the exterior surface of a separate glass sheet, the sheet being adhered to the exterior surface of polarizer 15 via a conventional optical adhesive. Facets 19 of BEF 17 and the ±50° diffuser axis were aligned horizontally substantially in parallel with one another. The specular and diffused reflections of this AMLCD were tested and turned out to be: specular 30°, about 1.9%; and diffused 30°, about 0.9%. These ambient reflection results were excellent yet unexpected.

It is noted that this Example differs from the previous Examples in that polarizer 15 was detached from the panel so that BEF 17 and diffuser 21 could be placed interior thereof. The index matching oil, of course, was disposed adjacent both sides of BEF 17, but no oil was placed between polarizer 15 and diffuser 21.

This concludes the Examples given and described herein for the purpose of specifically pointing out and clarifying different embodiments of this invention.

As will be appreciated by those of ordinary skill in the art, the various embodiments of this invention are clearly applicable to super-twisted LCDs, ECBs, passive displays, etc.

Once given the above disclosure, many other features, modifications, and improvements will become apparent to the skilled artisan. Such other features, modifications, and improvements are, and therefore, considered to be a part of this invention, the scope of which is to be determined by the following claims:

We claim:
1. In a backlit liquid crystal display which includes a backlight assembly for directing light toward a display panel, said display panel including a liquid crystal layer and being capable of providing an image to a remotely positioned viewer, the improvement comprising:

an optical system disposed on the viewer side of said liquid crystal layer, said optical system including a film means for substantially enlarging the effective viewing zone of said liquid crystal display and for providing substantial uniformity of contrast ratio and color uniformity in the viewing zone, and wherein said film means has a plurality of optical facets therein; and wherein said optical system includes a diffuser, and wherein said diffuser and said film means are affixed to said panel and sandwiched between a first polarizer and said liquid crystal layer so as to reduce the ambient diffused reflection of said display panel.

2. A backlit normally white twisted nematic liquid crystal display capable of providing an image to a remotely positioned viewer, comprising:

a display panel including a plurality of pixels, each said pixel being comprised of a pair of driving electrodes sandwiching a twisted nematic liquid crystal layer therebetween;

a backlight for directing at least partially collimated light toward said display panel;

an optical system affixed to said panel including a holographic diffuser and a refracting means disposed on the viewer side of said twisted nematic liquid crystal layer, said optical system providing said display with a contrast ratio of at least about 70:1 along the 0° vertical viewing axis at horizontal viewing angles up to about ±60°, and whereby said refracting means maintains the resolution of the displayed image; and wherein said display includes means for obtaining a specular 30° reflectance of less than about 2%, and a diffused 30° reflectance of less than about 5%.

3. The display of claim 2, wherein said optical system provides said display with a contrast ratio of at least about 90:1 along the 0° vertical viewing axis at horizontal viewing angles up to about ±60°.

4. The display of claim 2, wherein said display has a specular 30° reflectance of less than about 0.3%, and a diffused 30° reflectance of less than about 3%.

5. A backlit liquid crystal display comprising:

a backlight for directing rays of light toward a display panel;

said display panel including a liquid crystal layer and means for applying a voltage to said liquid crystal layer;

a holographic diffuser and a faceted film means for substantially collimating ambient light directed toward said liquid crystal layer, said diffuser and said faceted film means affixed to said display panel on the viewer side of, said liquid crystal layer, wherein said display panel when white substantially collimated light is directed toward said panel from said backlight has at least the following viewing characteristics:

a) a specular reflectance at about 0° vertical, 30° horizontal of less than about 2.0%;

b) a diffused reflectance at about 0° vertical, 30° horizontal of less than about 4%; and c) a contrast ratio of at least about 60:1 at viewing angles of one of: (i) about 0° vertical, ±60° horizontal; and (ii) about 0° horizontal, ±40° vertical.

6. The display of claim 5, wherein the 30° diffused reflectance is less than about 1.2%.

7. In a backlit liquid crystal display which includes a backlight assembly for directing light toward a display panel, said display panel including a liquid crystal layer and being capable of providing an image to a remotely positioned viewer, the improvement comprising:

an optical system disposed on the viewer side of said liquid crystal layer, said optical system including a film means for substantially enlarging the effective viewing zone of said liquid crystal display and for providing substantial uniformity of illumination with respect to contrast ratio and color uniformity, and wherein said film means has a plurality of optical facets therein; and wherein said backlight directs substantially collimated light toward said display panel, and said facets of said film means face said backlight and said light liquid crystal layer, said facets reducing the display's ambient light reflection and improving the displayed image's uniformity over a large range of viewing angles, and wherein said display further comprises a diffuser disposed exterior said film means, said film means thereby being disposed between said liquid crystal layer and said diffuser and wherein said diffuser is holographic and includes a roughened light scattering surface facing said viewer.

8. The display of claim 7, wherein said film means is laminated to the exterior surface of a first polarizer with said facets abutting said exterior surface of said first polarizer, and wherein said diffuser is affixed to said film means, said film means being sandwiched between said diffuser and said first polarizer.

9. The display of claim 7, wherein said optical facets are substantially triangular in nature.

10. The display of claim 7, wherein said display is a normally white twisted nematic type display and has a contrast ratio of at least about 80:1 at one of: (i) along the 0° vertical viewing axis at horizontal viewing angles of about ±60°; and (ii) along the 0° horizontal viewing axis at vertical viewing angles of about −30° and +40°; and wherein said display has a specular 15° reflectance of less than about 2.0% and a diffused 30° reflectance of less than about 4%.

11. A backlit liquid crystal display for displaying an image having improved viewing characteristics to a viewer, the display comprising:

a collimating backlight for directing substantially collimated light toward a display panel, said display panel including:
(i) a twisted nematic liquid crystal layer sandwiched between a front polarizer and a rear polarizer, said front polarizer being located on the viewer side of said liquid crystal layer;
(ii) electrodes for applying a voltage across said liquid crystal layer;
(iii) a light redirecting or redistributing means disposed on the viewer side of said liquid crystal layer, said light redirecting or redistributing means for enabling:
(a) substantially no backscatter in both transmission directions so as to reduce reflections in both directions; and
(b) in the transmission direction from said backlight toward the viewer, said light redirecting means diffusing light emitted from said backlight over a wide range of angles toward the viewer so as to improve contrast; and wherein as a result of said light redirecting or redistributing means, said display has a specular 30° reflectance of less than about 0.3%, a diffused 30° reflectance of less than about 1.2%, and a contrast ratio at viewing angles of about 0° vertical, ±30° horizontal, of at least about 60:1.

12. A method of displaying an image to a viewer using a twisted nematic liquid crystal display with reduced reflection and an enlarged viewing zone, the method comprising the steps of:

providing a collimating backlight;

emitting collimated light from the backlight toward the twisted nematic liquid crystal display;

selectively applying voltage across a liquid crystal layer in the display by way of electrodes;

redistributing the light after it exits the liquid crystal layer using a light redistributing system disposed on the viewer side of the liquid crystal layer;

substantially eliminating backscatter in both transmission directions using the redistributing system so as to reduce reflections in both directions;

diffusing light traveling from the liquid crystal layer toward the viewer over a wide range of angles using the redistributing system in order to improve contrast;

as a result of the distributing system, displaying an image to the viewer having a contrast ratio at viewing angles of about 0° vertical, ±30° horizontal, of at least about 60:1; and.

as a result of the distributing system, reducing specular 30° reflectance to less than about 0.3% and diffused 30° reflectance to less than about 1.2%.

* * * * *